US012780850B2

(12) United States Patent
Dolai et al.

(10) Patent No.: US 12,780,850 B2
(45) Date of Patent: Nov. 3, 2026

(54) PROCESS FOR SYNTHESIS OF ORGANOSILICON COMPOUNDS FROM HALOSILANES

(71) Applicant: MOMENTIVE PERFORMANCE MATERIALS INC., Waterford, NY (US)

(72) Inventors: Sukanta Dolai, Bangalore (IN); Shreedhar Bhat, Bangalore (IN); Gourav Tarafdar, Bangalore (IN)

(73) Assignee: MOMENTIVE PERFORMANCE MATERIALS, INC., Waterford, NY (US)

( * ) Notice: Subject to any disclaimer, the term of this patent is extended or adjusted under 35 U.S.C. 154(b) by 794 days.

(21) Appl. No.: 18/017,524

(22) PCT Filed: Jul. 23, 2021

(86) PCT No.: PCT/US2021/042911
§ 371 (c)(1),
(2) Date: Jan. 23, 2023

(87) PCT Pub. No.: WO2022/026307
PCT Pub. Date: Feb. 3, 2022

(65) Prior Publication Data

US 2023/0312617 A1 Oct. 5, 2023

(30) Foreign Application Priority Data

Jul. 25, 2020 (IN) ............................. 202021031933

(51) Int. Cl.

| | |
|---|---|
| ***C07F 7/14*** | (2006.01) |
| ***B01J 23/06*** | (2006.01) |
| ***B01J 27/138*** | (2006.01) |
| ***B01J 31/26*** | (2006.01) |
| ***C07F 7/08*** | (2006.01) |

(52) U.S. Cl.
CPC ................. *C07F 7/14* (2013.01); *B01J 23/06* (2013.01); *B01J 27/138* (2013.01); *B01J 31/26* (2013.01); *C07F 7/081* (2013.01); *C07F 7/0834* (2013.01)

(58) Field of Classification Search
CPC .......... B01J 23/06; B01J 27/138; B01J 31/26; C07F 7/0803; C07F 7/081; C07F 7/0827; C07F 7/0834
See application file for complete search history.

(56) References Cited

U.S. PATENT DOCUMENTS

| | | | | |
|---|---|---|---|---|
| 2,403,370 | A | 7/1946 | Hurd | |
| 2,444,784 | A | 7/1948 | Meals | |
| 3,646,091 | A | 2/1972 | Berger | |
| 3,666,783 | A | 5/1972 | Lefort | |
| 4,888,435 | A * | 12/1989 | Chadwick | C07F 7/122 556/469 |
| 5,498,739 | A | 3/1996 | Takeuchi et al. | |
| 6,156,918 | A | 12/2000 | Winterfield et al. | |
| 2004/0152913 | A1 | 8/2004 | Caprioli et al. | |

FOREIGN PATENT DOCUMENTS

| | | |
|---|---|---|
| CN | 1245807 | 3/2000 |
| DE | 293830 | 9/1991 |
| EP | 0812849 | 12/1997 |
| JP | 07-179476 | 7/1995 |
| JP | 10-001483 | 1/1998 |
| WO | 2002097393 | 12/2002 |

OTHER PUBLICATIONS

Li et al, "Selective mono-and allenylation of chlorosilanes using indium," Journal of Organometallic Chemistry, vol. 693, No. 25, 2008, Netherlands.

Patent Cooperation Treaty (PCT), International Search Report and Written Opinion for Application PCT/US2021/042911 filed on Jul. 23, 2021, mailed Oct. 13, 2021 International Searching Authority, EP.

* cited by examiner

*Primary Examiner* — Pancham Bakshi
(74) *Attorney, Agent, or Firm* — James Abruzzo; McDonald Hopkins LLC

(57) ABSTRACT

A process for synthesis of an organosilicon compound is provided herein. Also, novel organosilicon compounds prepared by the present process is provided herein. The process comprises the reaction of a halosilane with an organofunctional alkyl halide in the presence of a metal catalyst, a promoter, and an optional co-catalyst. The process provides an efficient synthetic route to produce organosilicon compounds. The process also allows synthesis of organosilicon compounds with a plurality of different functional groups.

16 Claims, No Drawings

PROCESS FOR SYNTHESIS OF ORGANOSILICON COMPOUNDS FROM HALOSILANES

CROSS REFERENCE TO RELATED APPLICATIONS

This application claims priority to and the benefit under 35 USC 371 of International Patent Application PCT/US2021/042911 filed on Jul. 23, 2021 which claims priority to and the benefit of India Patent Registration Provisional Application No. 202021031933, filed on Jul. 25, 2020, the disclosures of which i-s are incorporated herein by reference in their entireties.

FIELD OF INVENTION

The present invention relates to a process for synthesis of organosilicon compounds. In particular, the present invention relates to a process for synthesis of organosilicon compounds by reacting halosilanes with organofunctional alkyl halides.

BACKGROUND

Organosilicon compounds are a very important class of compounds not only in organic chemistry but also in other fields of chemistry such as, for example, material science, medicinal chemistry, agrochemistry, and others. Two of the most well-known processes for synthesis of organosilicon compounds are (i) olefin hydrosilylation with silicon hydrides, and (ii) cross-coupling between an organometallic compound with a silicon halide (Grignard reaction). Another process for synthesizing organosilicon compounds is (iii) cross-coupling utilizing an alkyl halide and a silicon-metal complex. Each of the above processes has its advantages, as well as disadvantages that limit wider use of these reactions at an industrial scale.

Hydrosilylation has conventionally been the most powerful of the aforementioned processes for synthesis of organosilicon compounds because of its atom efficiency in the process. Hydrosilylation, however, has several limitations including the occurrence of isomerization of olefin resulting in internal carbon-carbon double bonds, partial hydrogenation, poor regioselectivity (1,2 addition versus 1,4 addition), restricted availability of various Si—H materials, and limitations on the functional groups that can be employed because certain functional groups may interact with and poison the catalyst. Organo-magnesium (Grignard reagent) is the well-known and most widely used organo-nucleophile to react with a silicon-electrophile (e.g., chlorosilane). Due, however, to its high reactivity, poor selectivity, and poor functional group tolerance, the process has not found mainstream adoption in specialty products on an industrial scale. Therefore, there is a need for processes for synthesis of organosilicon compounds that overcomes the above-mentioned disadvantages.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Provided is a process for synthesizing organosilicon compounds. In one aspect, the process provides an efficient synthetic pathway for producing organosilicon compounds using a halosilane as the starting material. The process allows synthesis of organosilicon compounds with a variety of organofunctional groups.

In one aspect, provided is a process for synthesizing an organosilicon compound from the reaction of a halosilane with an organofunctional alkyl halide in the presence of a non-magnesium metal, a promoter, and an optional catalyst.

In one aspect, provided is a process of synthesizing an organosilicon compound of the formula (1)

$$[(R^1)—(C(R^2)(R^3))_m]_p—Si(R^4)_{4-n}(X^1)_{n-p} \quad (1)$$

via the reaction of a halosilane of the formula (2)

$$(X^1)_n—Si(R^4)_{4-n} \quad (2)$$

with p moles of an organofunctional alkyl halide of the formula (3):

$$[(R^1)—(C(R^2)(R^3))_m]—X^2 \quad (3)$$

where $R^1$ is a functional group independently selected from a $C_1$-$C_{20}$ alkyl, $—CR^5═CR^6_2$, $—C≡CR^7$, —CN, $—C(O)R^8$, $—OC(O)R^9$, $—C(O)OR^{10}$, $—SR^{11}$, $—S(O)_2R^{12}$, $—NR^{13}_2$, $—C(O)NR^{14}_2$, $—OC(O)—CR^{15}═R^{16}_2$, $—CF_3$, $—(CR^{17}_2)_n—CF_3$, —NCO, $—CS—OR^{18}$, $—CSSR^{19}$, $—NR^{20}C(O)—CR^{21}═CR^{22}_2$ a C6-C20 aryl, an aralkyl, or an alkaryl, where $R^5$, $R^6$, $R^7$, $R^8$, $R^9$, $R^{10}$, $R^1$, $R^{12}$, $R^{13}$, $R^{14}$, $R^{15}$, $R^{16}$, $R^{18}$, $R^{19}$, $R^{20}$, $R^{21}$, and $R^{22}$ are each independently H, a $C_1$-$C_{20}$ alkyl, a $C_3$-$C_{20}$ cycloalkyl, a $C_6$-$C_{30}$ aryl, an aralkyl, or an alkaryl, and $R^{17}$ is H or a $C_1$-$C_{10}$ alkyl; $R^2$ is H or a $C_1$-$C_{20}$ alkyl;

$R^3$ is H or a $C_1$-$C_{20}$ alkyl;

$R^4$ is a $C_1$-$C_{20}$ alkyl;

$X^1$ is F, Cl, Br, or I;

$X^2$ is F, Cl, Br, or I;

m is an integer in the range of 1-10;

n is an integer in the range of 1-4; and p is an integer in the range of 1-4 with the proviso that p is ≤n.

In one embodiment, $R^1$ is independently selected from a C1-C20 alkyl, $—CR^5═CR^6_2$, $—C≡CR^7$, —CN, $—C(O)R^8$, $—OC(O)R^9$, $—C(O)OR^{10}$, $—SR^{11}$, $—S(O)_2R^{12}$, $—NR^{13}_2$, $—C(O)NR^{14}_2$, $—OC(O)—CR^{15}═R^{16}_2$, $—CF_3$, $—(CR^{17}_2)_n—CF_3$, —NCO, $—CS—OR^{18}$, $—CSSR^{19}$, $—NR^{20}C(O)—CR^{21}═CR^{22}_2$ a C6-C20 aryl, an aralkyl, or an alkaryl, where $R^5$, $R^6$, $R^7$, $R^8$, $R^9$, $R^{10}$, $R^1$, $R^{12}$, $R^{13}$, $R^{14}$, $R^{15}$, $R^{16}$, $R^{18}$, $R^{19}$, $R^{20}$, $R^{21}$, and $R^{22}$ are each independently H, a C1-C20 alkyl, a C3-C20 cycloalkyl, a C6-C30 aryl, an aralkyl, or an alkaryl, and $R^{17}$ is H, a C1-C10 alkyl, or F.

In one embodiment of the process of any previous embodiment, the non-magnesium metal is selected from an alkali metal, an alkaline earth metal except magnesium, a transition metal, a post transition metal, a metalloid, a lanthanide, an actinide, or a combination of two or more thereof.

In one embodiment of the process of any previous embodiment, the non-magnesium metal is selected from Li, Na, K, Rb, Cs, Be, Ca, Sr, Ba, Fe, Co, Ni, Cu, Zn, B, Sb, Te, La, Ce, Sm, or a combination of two or more thereof. In one embodiment, the non-magnesium metal is Zn.

In one embodiment of the process of any previous embodiment, the molar ratio of the non-magnesium metal to the organofunctional alkyl halide is in a range of 0.5:1 to 1:1.5.

In one embodiment of the process of any previous embodiment, the promoter is a phosphorous containing compound, a sulfur containing compound, or a combination of two or more thereof.

In one embodiment of the process of any previous embodiment, the promoter is selected from a phosphine oxide, a phosphate, a phosphite, a phosphine, a phosphoramide, or a combination of two or more thereof, In one embodiment of the process of any previous embodiment, the phosphine oxide is of the formula $R^{20}{}_3P{=}O$ where each $R^{20}$ is independently a $C_4$-$C_{20}$ alkyl, a $C_3$-$C_{20}$ cyclic alkyl, an aralkyl, or an alkaryl.

In one embodiment of the process of any previous embodiment, the promoter is tributyl phosphine oxide (TBPO), trioctylphosphine oxide (TOPO), hexamethylphosphoramide (HMPA), trimorpholineophosphine oxide, tripyrrolidoniophospine oxide, or a combination thereof.

In one embodiment, of the process of any previous embodiment the promoter is a phosphoramide of the formula $(R^{21}{}_2N)_3P{=}O$ where each $R^{21}$ is independently a $C_1$-$C_{10}$ alkyl and a $C_3$-$C_{20}$ cyclic alkyl.

In one embodiment of the process of any previous embodiment, the process further comprises employing a catalyst.

In one embodiment, the catalyst is a metal selected from of a metal halide, a metal acetate, a metal ester, a metal amide, a metal triflate, a metal borate, a metal nitrate, or a combination of two or more thereof. In one embodiment, the metal halide comprises a metal selected from an alkali metal, an alkaline earth metal except magnesium, a transition metal, a post transition metal, a metalloid, a lanthanide, an actinide, or a combination of two or more thereof. In one embodiment, the catalyst is a metal iodide. In one embodiment, the catalyst is employed when $X^2$ is Cl.

In one embodiment of the process of any previous embodiment, the halosilane is reacted with the alkyl halide at a temperature in the range of about 10° C. to about 200° C. In one embodiment, the halosilane is reacted with the alkyl halide at a temperature of from about 70° C. to about 100° C.

In one aspect, the process allows synthesis of an organosilicon compound with a plurality of functional groups. In one embodiment, the organosilicon compound comprises at least two organofunctional groups that are different from one another.

In another aspect, provided is a process for synthesis of an organosilicon compound having at least two different organofunctional groups comprising:

(i) reacting a halosilane of the formula $(X^1)_1$—$Si(R^4)_{4-n}$ with p moles of a first organofunctional alkyl halide of the formula $[(R^1)$—$(C(R^2)(R^3))_m]$—$X^2$ to produce a first organosilicon compound of the formula $[(R^1)$—$(C(R^2)(R^3))_m]_p$—$Si(R^4)_{4-n}(X^1)_{n-p}$; and (ii) reacting the first organosilicon compound $[(R^1)$—$(C(R^2)(R^3))_m]_p$—$Si(R^4)_{4-n}(X^1)_{n-p}$ with p' moles of a second organofunctional alkyl halide of the formula $[(R^1)$—$(C(R^{2'})(R^{3'}))_{m'}]$—$X^{2'}$ to produce a second organosilicon compound of the formula $$([(R^1)\text{—}(C(R^2)(R^3))_m]_p)([(R^{1'})\text{—}(C(R^{2'})(R^3))_{m'}]_{p'})(\text{—}Si(R^4)_{4-n}(X^1)_{n-p-p'}$$

where $R^1$ and $R^{1'}$ are each independently an organo functional group;

$R^2$ and $R^{2'}$ are each independently H or a C1-C20 alkyl;

$R^3$ and $R^{3'}$ are each independently H or a C1-C20 alkyl;

$R^4$ is a C1-C20 alkyl;

$X^1$ is F, Cl, Br, or I;

$X^2$ and $X^{2'}$ are each independently F, Cl, Br, or I;

m and m' are each independently 1-10;

n is 1-4;

p is 1-4 with the proviso that p is ≤n;

where $R^{1'}$ is different from $R^1$; $R^{2'}$ is the same or different than $R^2$; $R^{3'}$ is the same or different from $R^3$, m' is the same or different from m, p' is ≤(n−p).

In one aspect, provided is a compound of formula (1):

$$[(R^1)\text{—}(C(R^2)(R^3))_m]_p\text{—}Si(R^4)_{4-n}(X^1)_{n-p} \quad (1)$$

where $R^1$ is an organofunctional group;

$R^2$ is H or a $C_1$-$C_{20}$ alkyl;

$R^3$ is H or a $C_1$-$C_{20}$ alkyl;

$R^4$ is a $C_1$-$C_{20}$ alkyl;

$X^I$ is F, Cl, Br, or I;

m is an integer in the range of 1-10;

n is an integer in the range of 1-4; and p is an integer in the range of 1-4 with the proviso that p is ≤n.

In one embodiment of the compound, m is an integer in the range of 3 to 10.

In one embodiment of the compound, p is an integer in the range of 2 to 4.

In one embodiment of the compound, p is 3.

In one embodiment of the compound, m is an integer in the range of 3 to 10, and p is an integer in the range of 2 to 4.

In one embodiment of the compound, $R^1$ is independently selected from a $C_1$-$C_{20}$ alkyl, —$CR^5{=}CR^6{}_2$, —C≡$CR^7$, —CN, —$C(O)R^8$, —$OC(O)R^9$, —$C(O)OR^{10}$, —$SR^{11}$, —$S(O)_2R^{12}$, —$NR^{13}{}_2$, —$C(O)NR^{14}{}_2$, —OC(O)—$CR^{15}{=}R^{16}{}_2$, —$CF_3$, —$(CR^{17}{}_2)_n$—$CF_3$, —NCO, —CS—$OR^{18}$, —$CSSR^{19}$, —$NR^{20}C(O)$—$CR^{21}{=}CR^{22}{}_2$ a $C_6$-$C_{20}$ aryl, an aralkyl, or an alkaryl, where $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{18}$, $R^{19}$, $R^{20}$, $R^{21}$, and $R^{22}$ are each independently H, a $C_1$-$C_{20}$ alkyl, a $C_3$-$C_{20}$ cycloalkyl, a $C_6$-$C_{30}$ aryl, an aralkyl, or an alkaryl, and $R^{17}$ is H, a $C_1$-$C_{10}$ alkyl, or F.

In one embodiment of the compound, $R^1$ is independently selected from a —C≡$CR^7$, —$C(O)R^8$, —$C(O)OR^{10}$, —$SR^{11}$, —CS—$OR^{18}$, —$CSSR^{19}$, —$NR^{20}C(O)$—$CR^{21}{=}CR^{22}{}_2$ a C6-C20 aralkyl, or an alkaryl, where $R^7$, $R^8$, $R^{10}$, $R^1$, $R^{18}$, $R^{19}$, $R^{20}$, $R^{21}$, and $R^{22}$ are each independently H, a $C_1$-$C_{20}$ alkyl, a $C_3$-$C_{20}$ cycloalkyl, a $C_6$-$C_{30}$ aryl, an aralkyl, or an alkaryl, and $R^{17}$ is H, a $C_1$-$C_{10}$ alkyl, or F.

In one embodiment of the compound, wherein $X^1$ is Cl.

The following description is illustrative of various aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used in the instant application, the term "alkyl" includes straight, branched, and cyclic alkyl groups. Specific and non-limiting examples of alkyls include, but are not limited to, methyl, ethyl, propyl, isopropyl butyl, isobutyl, tert-butyl, pentyl, hexyl, octyl, nonyl, decyl, etc. In embodiments, the alkyl group is chosen from a C1-C30 alkyl, a C1-C18 alkyl, a C2-C10 alkyl, even a C4-C6 alkyl. In embodiments, the alkyl is chosen from a $C_1$-$C_6$ alkyl.

As used herein, the term "substituted alkyl" refers to an alkyl group that contains one or more substituent groups that are inert under the process conditions to which the compound containing these groups is subjected. The substituent groups also do not substantially interfere with the processes described herein. In some embodiments, the substituted alkyl group is a C1-C18 substituted alkyl. In other embodiments, it is a C1-C10 substituted alkyl. The substituents for the alkyl include, but are not limited to, the inert functional groups described herein.

As used herein, the term "aryl" refers to a non-limiting group of any aromatic hydrocarbon from which one hydrogen atom has been removed. An aryl may have one or more aromatic rings, which may be fused, or connected by single bonds or other groups. Specific and non-limiting examples of aryls include, but are not limited to, tolyl, xylyl, phenyl, and naphthalenyl. In embodiments, an aryl group may be chosen from a C6-C30 aryl, a C6-C20 aryl, even a C6-C10 aryl.

As used herein, the term "substituted aryl" refers to an aromatic group that contains one or more substituent groups that are inert under the process conditions to which the compound containing these substituent groups is subjected. The substituent groups also do not substantially interfere with processes described herein. Similar to an aryl, a substituted aryl may have one or more aromatic rings, which may be fused, connected by single bonds or other groups; however, when the substituted aryl has a heteroaromatic ring, the free valence in the substituted aryl group can be to a heteroatom (such as nitrogen) of the heteroaromatic ring instead of a carbon. If not otherwise stated, the substituents of the substituted aryl groups may contain 0 to about 30 carbon atoms, specifically from 0 to 20 carbon atoms, more specifically, from 0 to 10 carbon atoms. In one embodiment, the substituents are chosen from the inert groups described herein.

As used herein, the term "alkenyl" refers to any straight, branched, or cyclic alkenyl group containing one or more carbon-carbon double bonds, where the point of substitution can be either at a carbon-carbon double bond or elsewhere in the group. Specific and non-limiting examples of alkenyls include, but are not limited to, vinyl, propenyl, allyl, methallyl, and ethylidenyl norbornane.

As used herein, the term "alkaryl" refers to an aryl group comprising one or more alkyl substituents. Non-limiting examples of alkaryl compounds include tolyl, xylyl, etc.

As used herein, the term "aralkyl" refers to an alkyl group in which one or more hydrogen atoms have been substituted by the same number of aryl groups, which aryl groups may be the same or different from one another. Non-limiting examples of aralkyls include benzyl and phenylethyl.

As used herein, the term "organosilicon compound" may be used interchangeably with the term "organofunctional silicon compounds" and includes silicon-based compounds having one or more organofunctional groups bonded to a silicon atom. Organosilicon compounds can include organofunctional silanes and organofunctional siloxanes. The organosilicon compound can include a plurality of organofunctional groups that may be the same or different from one another.

The present disclosure relates to a process for synthesis of organosilicon compounds and a series of novel organosilicon compounds synthesized by the present process. The terms "process" and "method" for synthesizing the compounds are interchangeably used herein after. The process comprises the reaction of a halosilane with an organofunctional alkyl halide. The process provides a useful route for synthesizing a wide variety of organosilicon compounds. The process provides an efficient path for synthesizing organosilicon compounds with a plurality of functional groups. The process also provides a synthetic route for organosilicon compounds with a plurality of organofunctional groups where the organosilicon compound has at least two different organofunctional groups.

The present disclosure provides a process for synthesis of an organosilicon compound of the formula (1)

$$[(R^1)\text{—}(C(R^2)(R^3))_m]_p\text{—}Si(R^4)_{4-n}(X^1)_{n-p} \quad (1)$$

via the reaction of a halosilane of the formula (2)

$$(X^1)_n\text{—}Si(R^4)_{4-n} \quad (2)$$

with p moles of an organofunctional alkyl halide of the formula (3):

$$[(R^1)\text{—}(C(R^2)(R^3))_m]\text{—}X^2 \quad (3)$$

where $R^1$ is a functional group independently selected from a $C_1$-$C_{20}$ alkyl, —$CR^5$═$CR^6_2$, —C≡$CR^7$, —CN, —C(O)$R^8$, —OC(O)$R^9$, —C(O)O$R^{10}$, —S$R^{11}$, —S(O)$_2R^{12}$, —N$R^{13}_2$, —C(O)N$R^{14}_2$, —OC(O)—$CR^{15}$═$R^{16}_2$, —$CF_3$, —$(CR^{17}_2)_n$—$CF_3$, —NCO, —CS—O$R^{18}$, —CSS$R^{19}$, —N$R^{20}$C(O)—$CR^{21}$═$CR^{22}_2$ a $C_6$-$C_{20}$ aryl, an aralkyl, or an alkaryl, where $R^5$, $R^6$, $R^7$, $R^8$, $R^9$, $R^{10}$, $R^1$, $R^{12}$, $R^{13}$, $R^{14}$, $R^{15}$, $R^{16}$, $R^{18}$, $R^{19}$, $R^{20}$, $R^{21}$, and $R^{22}$ are each independently H, a $C_1$-$C_{20}$ alkyl, a $C_3$-$C_{20}$ cycloalkyl, a $C_6$-$C_{30}$ aryl, an aralkyl, or an alkaryl, and $R^{17}$ is H or a $C_1$-C10 alkyl;

$R^2$ is H or a $C_1$-$C_{20}$ alkyl;

$R^3$ is H or a $C_1$-$C_{20}$ alkyl;

$R^4$ is a $C_1$-$C_{20}$ alkyl;

$X^1$ is F, Cl, Br, or I;

$X^2$ is F, Cl, Br, or I;

m is an integer in the range of 1-10;

n is an integer in the range of 1-4; and p is an integer in the range of 1-4 with the proviso that p is ≤n.

Specifically, n and p may have integer values as follows:

n=1; p=1
n=2; p=1
n=2; p=2
n=3; p=1
n=3; p=2
n=3; p=3
n=4; p=1
n=4; p=2
n=4; p=3
n=4; p=4

In one embodiment, $R^2$ and $R^3$ are independently selected from H, a $C_1$-$C_{20}$ alkyl, a $C_2$-$C_{16}$ alkyl, a $C_3$-$C_{10}$ alkyl, or a $C_4$-$C_6$ alkyl. In one embodiment, $R^2$ and $R^3$ are each H. In one embodiment, $R^2$ and $R^3$ are each a $C_1$-$C_4$ alkyl. In embodiments, m is an integer in the range of 1-10, 2-8, or 4-6. In one embodiment, m is an integer in the range of 1-4.

In one embodiment, $R^4$ is a $C_{1-20}$ alkyl, a $C_2$-$C_{16}$ alkyl, a $C_3$-$C_{10}$ alkyl, or $C_4$-$C_6$ alkyl. In one embodiment, $R^4$ is —$CH_3$.

As indicated in the formulas, $X^1$ and $X^2$ can each be F, Cl, Br, or I. $X^1$ and $X^2$ can be the same or different from one another. In one embodiment, both $X^1$ and $X^2$ are the same halogen atoms. In one embodiment, $X^1$ and $X^2$ are each Cl.

The reaction of a halosilane of formula (2) and an alkyl halide of formula (3) is carried out in the presence of a non-magnesium metal, an optional catalyst, and a promoter. The reaction may be conducted in a solvent.

The reaction is typically carried out in the presence of a non-magnesium metal. The non-magnesium metal may be in a powder form of a metal. Examples of non-magnesium metal that may be used include, but are not limited to, an alkali metal, an alkaline earth metal except magnesium, a transition metal, a post transition metal, a metalloid, a lanthanide, an actinide, or a combination of two or more thereof. Examples of suitable alkali metals include Li, Na, K, Rb, and/or Cs. Examples of suitable alkaline earth metals include Be, Ca, Sr, and/or Ba. Examples of suitable transition metals include, but are not limited to, Fe, Co, Ni, Cu, and/or Zn. Examples of suitable metalloids include, but are not limited to B, Sb, and/or Te. Examples of suitable lanthanides and actinides include, but are not limited to, La, Ce, and/or Sm.

In one embodiment, the non-magnesium metal is zinc metal. Advantageously, in one embodiment, the zinc metal is in the powder form.

In the reaction, the number of moles of non-magnesium metal used should be equal to or greater than the moles of organofunctional alkyl halide employed in the reaction. For example, where it is desirable to add a plurality of organofunctional alkyl groups to the silane, the number of moles of metal non-magnesium metal should be at least equal to the number of moles of organofunctional alkyl halide being employed. If, for example, two organofunctional alkyl groups are being added to a halosilane with two or more halogen groups, then at least two moles of metal non-magnesium metal would be employed in the reaction.

In some embodiments of the process, the molar ratio of the non-magnesium metal to the organofunctional alkyl halide is in a range of 0.5:1 to 1:5. In some other embodiments of the process, the molar ratio of the non-magnesium metal to the organofunctional alkyl halide is in a range of 0.5:1 to 1:1.5. In one or more embodiments of the process, the molar ratio of the non-magnesium metal to the organofunctional alkyl halide is at least 1:1. In some other embodiments, the molar ratio of the non-magnesium metal to the organofunctional alkyl halide is 1:1.5.

In one embodiment, a catalyst is employed in the method of forming the organosilicon compounds. The catalyst is typically a metal salt. The metal salt is selected from a metal halide, a metal acetate, a metal ester, a metal amide, a metal triflate, a metal borate, a metal nitrate, or a combination of two or more thereof. The metal salt (catalyst) comprises a metal selected from an alkali metal, an alkaline earth metal except magnesium, a transition metal, a post transition metal, a metalloid, a lanthanide, an actinide, or a combination of two or more thereof. Examples of suitable alkali metals include Li, Na, K, Rb, and/or Cs. Examples of suitable alkaline earth metals include Be, Ca, Sr, and/or Ba. Examples of suitable transition metals include, but are not limited to, Fe, Co, Ni, Cu, and/or Zn. Examples of suitable metalloids include, but are not limited to B, Sb, and/or Te. Examples of suitable lanthanides and actinides include, but are not limited to, La, Ce, and/or Sm.

In one embodiment, the catalyst is selected from a metal halide such as an alkali metal halide, an alkaline earth metal halide, or a transition metal halide. In one embodiment, the catalyst is a metal iodide. Some exemplary metal halides include, but are not limited to $ZnI_2$, LiBr, LiI, KI, NaI, $ZnBr_2$, KBr, NaBr, etc.

In one embodiment, when the alkyl halide (3) is an alkyl chloride (i.e., when $X^2$ is Cl), then the catalyst is generally required and should be employed in the reaction. In one embodiment, when the alkyl halide (3) is an alkyl bromide or alkyl iodide (i.e., when $X^2$ is Br or I), the catalyst is optional.

The catalyst, when employed in the reaction, can be present in an amount of:

from about 0.01 mol % to about 100 mol %, about 0.1 mol % to about 90 mol %, about 1 mol % to about 80 mol %, about 5 mol % to about 75 mol %, about 10 mol % to about 60 mol %, about 20 mol % to about 50 mol %, or about 30 mol % to about 40 mol % with respect to the moles of organofunctional alkyl halide;

from about 0.01 mol % to about 100 mol %, about 0.1 mol % to about 90 mol %, about 1 mol % to about 80 mol %, about 5 mol % to about 75 mol %, about 10 mol % to about 60 mol %, about 20 mol % to about 50 mol %, or about 30 mol % to about 40 mol % with respect to the moles of halosilane; or from about 0.01 mol % to about 100 mol %, about 0.1 mol % to about 90 mol %, about 1 mol % to about 80 mol %, about 5 mol % to about 75 mol %, about 10 mol % to about 60 mol %, about 20 mol % to about 50 mol %, or about 30 mol % to about 40 mol % with respect to the moles of non-magnesium metal.

The present process comprises a promoter. The term "promoter" refers to herein is a compound that facilitates the reaction by removing the metal-halide byproduct by formation of a complex and thereby driving the reaction to form the desired product.

The promoter presumably also assisting in stabilizing the metal-complex. Some of these promoters can be regenerated and recycled easily. In some embodiments, the promoter functions as a non-reactive solvent. In embodiments of the process, the promoter is typically a phosphorous or sulfur containing compound. Examples of suitable promoters include, but are not limited to phosphine oxides, phosphates, phosphites, phosphonium salts, phosphines, phosphoramides, or a combination of two or more thereof.

In one embodiment, the promoter is a phosphine oxide. Examples of suitable phosphine oxides are those having a formula $R^{20}{}_3P{=}O$ where each $R^{20}$ is independently selected from a $C_4$-$C_{20}$ alkyl, a $C_3$-$C_{20}$ cyclic alkyl, an aralkyl, an alkaryl. Examples of phosphine oxides suitable as the promoter include, but are not limited to, tributyl phosphine oxide (TBPO), trioctylphosphine oxide (TOPO), triphenyl phosphineoxide (TPPO), etc.

In one embodiment, the promoter is a phosphoramide. Examples of suitable phosphoramides include those of the formula $(R^{21}{}_2N)_3P{=}O$ where each $R^{21}$ is independently selected from a $C_1$-$C_{10}$ alkyl and a $C_3$-$C_{20}$ cyclic alkyl. In one embodiment, $R^{21}$ is a $C_{2-8}$ alkyl, a $C_3$-$C_6$ alkyl, or a $C_4$-$C_5$. In one embodiment, $R^{21}$ is a C6 alkyl. The cyclic alkyl group can be a monovalent (individual) group attached to the nitrogen atom or it may be a divalent group that forms a ring with the nitrogen atom as part of the ring. The cyclic alkyl groups (whether separate groups or taken to form a ring with the nitrogen atom) can include heteroatoms selected from N, O, and S in the ring. In one embodiment the cyclic alkyl groups include an oxygen atom in the ring structure. An example of a phosphoramide suitable as the promoter is, but is not limited to, hexamethylphosphoramide (HMPA), Trimorpholinophosphine Oxide or Tripyrrolidinophosphine Oxide.

The promoter is generally present in an amount:

from about 0.01 mol % to about 100 mol %, about 0.1 mol % to about 90 mol %, about 1 mol % to about 80 mol %, about 5 mol % to about 75 mol %, about 10 mol % to about 60 mol %, about 20 mol % to about 50 mol %, or about 30 mol % to about 40 mol % with respect to the moles of organofunctional alkyl halide;

from about 0.01 mol % to about 100 mol %, about 0.1 mol % to about 90 mol %, about 1 mol % to about 80 mol %, about 5 mol % to about 75 mol %, about 10 mol % to about 60 mol %, about 20 mol % to about 50 mol %, or about 30 mol % to about 40 mol % with respect to the moles of halosilane; or from about 0.01 mol % to about 100 mol %, about 0.1 mol % to about 90 mol %, about 1 mol % to about 80 mol %, about 5 mol % to about 75 mol %, about 10 mol % to about 60 mol %, about 20 mol % to about 50 mol %, or about 30 mol % to about 40 mol % with respect to the moles of non-magnesium metal.

In one or more embodiments, the present process is performed in a solvent. Solvent for the process can be selected as desired, with an option of selecting from a variety of different solvents known. The solvent can be a polar solvent or a non-polar solvent. The solvent can be selected from an alkane solvent, a cyclic alkane solvent, a furan solvent, an aromatic solvent, an acetyl solvent, an ester solvent, a nitrile solvent, a glycolic solvent, an ether solvent, a sulfide solvent, a sulfoxide solvent, a cyclic amide solvent, a formamide solvent, an imidazole solvent, a ketone solvent, or a combination of two or more thereof. When multiple materials are used for the solvent, whether of the same category of material (e.g., different alkane solvents) or different categories of material, the respective materials can be employed in any suitable ratio as desired. Solvents used in amounts less than that of another solvent may be considered and referred to herein as a "co-solvent."

Examples of alkane solvents include, but are not limited to, the lower saturated alkanes of from 3 to 20 carbon atoms, halogenated saturated alkanes of from 4 to 10 carbon atoms, and aromatic hydrocarbons of from 6 to 20 carbon atoms. Examples of suitable alkane solvents include, but are not limited to, propane, butane, pentane, heptane, hexane, nonane, decane, and dodecane.

Examples of cyclic alkane solvents include, but are not limited to, C3-C20 cyclic alkanes such as cyclopropane, cyclobutane, cyclopentane, cyclohexane, cyclooctane, etc.

Examples of suitable aromatic solvents include, but are not limited to, a C6-C20 aromatic solvent, or a C6-C15 aromatic solvent. In one embodiment, the aromatic solvent is selected from toluene, xylene, naphthalene, naphthenic oil, alkylated naphthalene, diphenyl, polychlorinated biphenyls, polycyclic aromatic hydrocarbons, or any combinations or mixtures thereof.

Examples of suitable ether solvents include, but are not limited to, diisopropyl ether, diglyme, dimethoxyethane, etc.

Examples of suitable ester solvents include, but are not limited to, ethyl acetate.

Examples of suitable nitrile solvents include, but are not limited to, acetonitrile.

Examples of suitable glycolic solvents include, but are not limited to, mono and di-alkyl ethers of alkylene glycols, dialkylene glycols, trialkylene glycols, etc. Some examples of glycolic solvents include, but are not limited to, propylene glycol, polyethylene glycol, polypropylene glycol, glycerol, hexylene glycol, ethylene glycol dimethyl ether, polyethyleneglycolalkylethers, diethylene glycol monoethyl ether, diethylene glycol monopropyl ether, diethylene glycol monobutyl ether, tripropylene glycol methyl ether, propylene glycol methyl ether (PM), dipropylene glycol methyl ether (DPM), propylene glycol methyl ether acetate (PMA), dipropylene glycol methyl ether acetate (CPMA), propylene glycol n-butyl ether, dipropylene glycol monobutyl ether, ethylene glycol n-butyl ether and ethylene glycol n-propyl ether, etc.

Examples of suitable sulfide solvents include, but are not limited to, dimethyl sulfide, diethyl sulfide, dipropyl sulfide, dibutyl sulfide, etc. Examples of suitable sulfoxide solvents include, but are not limited to, dimethyl sulfoxide. Examples of suitable cyclic amide solvents include, but are not limited to, N-methylpyrrolidone. Examples of suitable formamide solvents include, but are not limited to, N, N-dimethyl formamide, dimethylacetamide. Examples of suitable imidazole solvents include but are not limited to, methyl imidazole, dimethyl imidazole, etc. Examples of suitable ketone solvents include, but are not limited to, acetone, methyl ethyl ketone and so forth.

In some embodiments of the present process, one or more non-reactive solvents are used. The term 'non-reactive solvent' as used herein refers to a solvent which does not react with Grignard type of complex. Typical non-reactive solvents used in the present process include, but are not limited to, toluene, xylene, diglyme, cyclohexane. In a few examples, cyclic solvents e.g., THF, Di-oxane were used, however, the processes using these solvents do not result in the desired product (see, for example, comparative examples 1 to 9). It is presumed that the cyclic solvent, used in these examples, reacts with the Zn-complex formed in the process instead of reacting with halosilane (reactant). However, the process employing toluene as a solvent lead to the desired product. In some embodiments, the promoter used in the present process additionally acts as a solvent, as shown in Example no. 25.

The present process can be performed over a wide temperature range. In one embodiment, the process is performed at a temperature in the range of 10° C. to about 200° C. Advantageously, it is performed in the range of 20° C. to about 175° C. or 50° C. to about 150° C., more advantageously it is performed in the range of 70° C. to about 100° C.

In one embodiment, the present process is carried out by (i) providing a mixture of the non-magnesium metal, promoter, and optional catalyst, (ii) adding the halosilane to the mixture of (i); and (iii) adding the organofunctional alkyl halide to the mixture of (ii) and heating to produce the organosilicon compound. The method can be carried out in an inert atmosphere such as under a nitrogen atmosphere.

The organosilicon compound can be obtained by any suitable method. In one embodiment, the final product of organosilicon compound is obtained by filtering the product obtained in step (iii), optionally under an inert atmosphere, and isolating the product via vacuum distillation. Vacuum distillation may be carried out at a temperature in the range of 120° C. to about 180° C. and at a pressure of from about 1 to about 5 mbar.

The present process enables synthesis of organosilicon compounds with a plurality of functional groups by utilizing a halosilane with a plurality of halogen atoms and controlling the molar ratio of organofunctional halide relative to the halosilane. This may be utilized to functionalize an organosilicon compound with a particular type of organofunctional group. The process also allows synthesis of organosilicon compounds with different organofunctional groups. To produce an organosilicon compound with at least two different organofunctional groups, the process comprises (i) reacting a first organofunctional alkyl halide with a halosilane comprising a plurality of halogen atoms to produce a first organosilicon compound comprising a halogen functional group; and (ii) providing a second organofunctional alkyl halide comprising an organofunctional group different from the organofunctional group of the first organofunctional alkyl halide, and reacting the second organofunctional alkyl halide with the first organosilicon compound comprising a halogen functional group to provide a second organosilicon compound comprising different organofunctional groups.

In one embodiment of the process, the organosilicon compound has at least two non-identical organofunctional groups. In some embodiments, the process includes (i) reacting a halosilane of the formula $(X')_n—Si(R^4)_{4-n}$ with p moles of a first organofunctional alkyl halide of the formula $[(R^1)—(C(R^2)(R^3))_m]—X^2$ to produce a first organosilicon compound of the formula $[(R^1)—(C(R^2)(R^3))_m]_p—Si(R^4)_{4-n}(X^1)_{n-p}$. and (ii) reacting the first organosilicon compound of the formula $[(R^1)—(C(R^2)(R^3))_m]_p—Si(R^4)_{4-n}(X^1)_{n-p}$ with p' moles of a second organofunctional alkyl halide of the formula $[(R^1)—(C(R^{2'})(R^{3'}))_{m'}]—X^{2'}$ to produce a second organosilicon compound of the formula $([(R^1)—(C(R^2)(R^3))_m]p)([(R^1)—(C(R^{2'})(R^3))_{m'}]_{p'})(—Si(R^4)_{4-n}(X^1)_{n-p-p'}$, where $R^1$ and $R^{1'}$ are each independently an organofunctional group; $R^2$ and $R^{2'}$ are each independently H or a C1-C20 alkyl; $R^3$ and $R^{3'}$ are each independently H or a C1-C20 alkyl; $R^4$ is a C1-C20 alkyl; $X^1$ is F, Cl, Br, or I; $X^2$ and $X^{2'}$ are each independently F, Cl, Br, or I; m and m' are each independently 1-10; n is 1-4; p is 1-4 with the proviso that p is ≤n; where $R^{1'}$ is different from $R^1$; $R^{2'}$ is the same or different than $R^2$; $R^{3'}$ is the same or different from $R^3$, m' is the same or different from m, p' is ≤(n−p).

The process for the synthesis of an organosilicon compound having different organofunctional groups can be described, in one embodiment, as follows:

$$(X^1)_n—Si(R^4)_{4-n}+p[(R^1)—(C(R^2)(R^3))_m]—X^2 \rightarrow [(R^1)—(C(R^2)(R^3))_m]_p—Si(R^4)_{4-n}(X^1)_{n-p} \quad (i)$$

where p is less than n;

$$[(R^1)—(C(R^2)(R^3))_m]_p—Si(R^4)_{4-n}(X^1)_{n-p}+p'[(R^{1'})—(C(R^{2'})(R^{3'}))_{m'}]—X^{2'}$$

$$\downarrow$$

$$([(R^1)—(C(R^2)(R^3))_m]_p)([(R^{1'})—(C(R^{2'})(R^3))_{m'}]_{p'})(—Si(R^4)_{4-n}(X^1)_{n-p-p'} \quad (ii)$$

where $R^{1'}$ is different from $R^1$; $R^{2'}$ is the same or different than $R^2$; $R^{3'}$ is the same or different from $R^3$, m' is the same or different from m, p' is ≤(n−p).

In the synthesis of an organosilicon compound having different functional groups, the various steps may be carried out as desired or needed to yield the desired product. In embodiments, the process may require separately isolating a first organosilicon compound and then subsequently conducting the reaction with the first organosilicon compound (bearing a halogen functional group) with a second organosilicon compound. Isolating the first organosilicon compound may include various steps or processes as needed including, but are not limited to, driving off any solvent, collecting, drying, and/or purifying the product. In another embodiment, the process for producing an organosilicon compound with at least two different organofunctional groups may be conducted in a continuous, semi-continuous, or batch wise process where the process includes reacting the first organofunctional alkyl halide with the halosilane to produce a solution comprising the first organosilicon compound comprising a halogen functional group and then adding the second organosilicon compound to that solution to produce the second organosilicon compound. In another embodiment, the process is a one-pot reaction, wherein all the reactants may be added to a single pot and product will obtained from the same pot. In one or more embodiments, the first organosilicon compound and the second organosilicon compound are obtained with a selectivity of more than 99%. It will be appreciated that additional catalyst, solvent, and/or co-catalyst may be added as needed to the step of reacting the second organofunctional alkyl halide with the first organosilicon compound in presence of a non-magnesium metal.

Additionally, it will be appreciated that the process for synthesis of an organosilicon compound with a plurality of different functional groups is not limited to synthesizing an organosilicon compound with just two different organofunctional groups. The process could be employed to synthesize an organosilicon compound with two, three, or four different organofunctional groups. The process developed presented here not only produces various mono-/multi-functional halosilanes, but also allows synthesis of functional alkoxy silanes, functional cyclic and linear silicones utilizing organofunctional halosilane as an intermediate. A simplified scheme representing an example embodiment for producing such compounds is presented below.

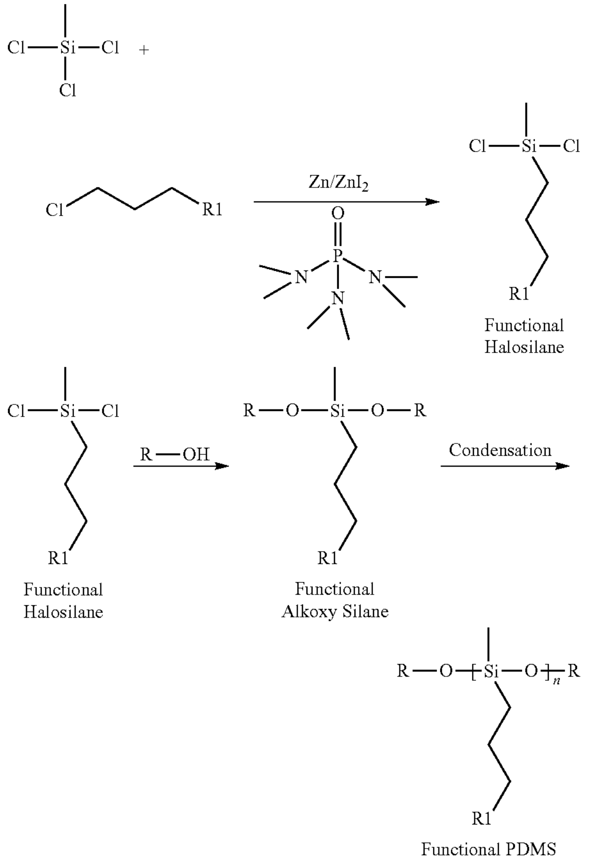

-continued

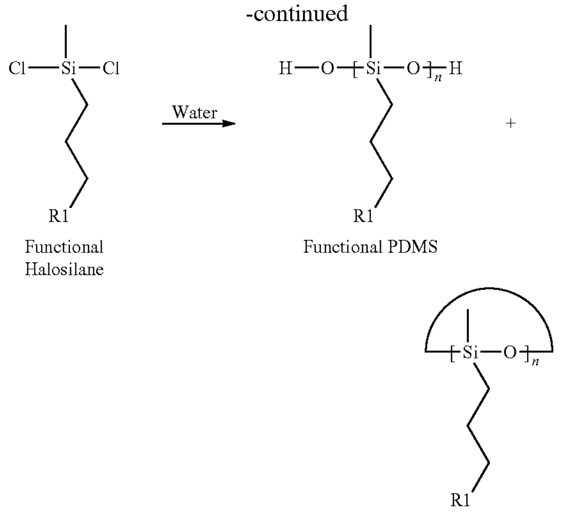

Functional Halosilane

Functional PDMS

Functional cyclic PDMS

In one or more embodiments, a compound of formula (1) is made using the process of the present specification. The compound of formula (1) is:

$$[(R^1)—(C(R^2)(R^3))_m]_p—Si(R^4)_{4-n}(X)_{n-p} \quad (1)$$

In formula (1), $R^1$ is an organofunctional group; $R^2$ is H or a C1-C20 alkyl; $R^3$ is H or a $C_1$-$C_{20}$ alkyl; $R^4$ is a $C_1$-$C_{20}$ alkyl; $X^1$ is F, Cl, Br, or I; m is an integer in the range of 1-10; n is an integer in the range of 1-4; and p is an integer in the range of 1-4 with the proviso that p is $\leq$n.

In one or more embodiments of compound of formula (1), m is an integer greater than or equal to 3. In some embodiments, m of formula (1) is an integer in the range from 3 to 10. In some embodiments, m of formula (1) is an integer in the range from 4 to 9. In some embodiments, m of formula (1) is an integer in the range from 5 to 8. In some other embodiments, m of formula (1) is an integer in the range from 6 to 7.

In one or more embodiments of the compound of formula (1), p is an integer in a range from 2 to 4. In some embodiments, p of formula (1) is an integer in a range of 1 to 3. In one embodiment, p of formula (1) is an integer of 1. In one embodiment, p of formula (1) is an integer of 2. In one embodiment, p of formula (1) is an integer of 3. In one embodiment, p of formula (1) is an integer of 4.

In one or more embodiments of the compound of formula (1), m is an integer in the range of 3 to 10 and/or wherein p is an integer in the range of 2 to 4. In some embodiments of the compound of formula (1), m is an integer in the range of 3-10, wherein p is an integer in the range of 2-4. In some embodiments of the compound of formula (1), m is an integer in the range of 3-10, wherein p is an integer of 3.

In one or more exemplary embodiments, when m=3, p=4, and n=4, the compound of structure (1) is an organosilane of structure $Si(R^1)_4$.

In one or more exemplary embodiments, when m=3, p=1, and n=4, then the compound of structure (1) is an organotrihalosilane of structure $Si(R^4)(X^1)_3$ and in another exemplary embodiment, when m=3, p=1, n=3, then the compound of structure (1) is an organodihalosilane of structure $Si(R^4)(R^1)(X^1)_2$.

In one example, when p of formula (1) is 3, m=3, and n=4, then the compound of structure (1) is:

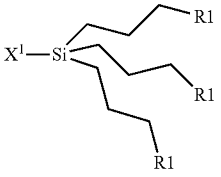

wherein $R^1$ and $X^1$ are as described above.

In another example, when p of formula (1) is 2, m=3, and n=3, then the compound of structure (1) is:

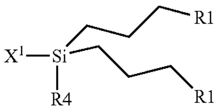

wherein $R^1$, $R^4$ and $X^1$ are as described above.

In another example, when p of formula (1) is 2, m=3, and n=2, then the compound of structure (1) is

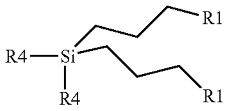

wherein $R^1$ and $R^4$ are as described above.

In another example, when p of formula (1) is 1, m=3, and n=2, then the compound of structure (1) is

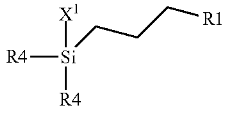

wherein $R^1$, $R^4$ and $X^1$ are as described above.

In another example, when p of formula (1) is 3, m=3, and n=3, then the compound of structure (1) is

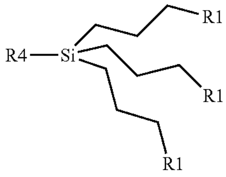

wherein $R^1$ and $R^4$ are as described above.

In one or more embodiments of the compound of formula (1), wherein $R^1$ is independently selected from a $C_1$-$C_{20}$ alkyl, $—CR^5{=}CR^6_2$, $—C{\equiv}CR^7$, —CN, $—C(O)R^8$, $—OC(O)R^9$, $—C(O)OR^{10}$, $—SR^{11}$, $—S(O)_2R^{12}$, $—NR^{13}_2$, $—C(O)NR^{14}_2$, $—OC(O)—CR^{15}{=}R^{16}_2$, $—CF_3$, $—(CR^{17}_2)_n—CF_3$, —NCO, $—CS—OR^{18}$, $—CSSR^{19}$, $—NR^{20}C(O)—CR^{21}{=}CR^{22}_2$ a $C_6$-$C_{20}$ aryl, an aralkyl, or an alkaryl, where $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{18}$, $R^{19}$, $R^{20}$, $R^{21}$, and $R^{22}$ are each independently H, a $C_1$-$C_{20}$ alkyl, a $C_3$-$C_{20}$ cycloalkyl, a $C_6$-$C_{30}$ aryl, an aralkyl, or an alkaryl, and $R^{17}$ is H, a $C_1$-$C_{10}$ alkyl, or F.

In one or more embodiments of the compound of formula (1), wherein $R^1$ is independently selected from a —C≡$CR^7$, —C(O)$R^8$, —C(O)$OR^{10}$, —$SR^{11}$, —CS—$OR^{18}$, —$CSSR^{19}$, —$NR^{20}$C(O)—$CR^{21}$═$CR^{22}_2$ a $C_6$-$C_{20}$ aralkyl, or an alkaryl, where $R^7$, $R^8$, $R^{10}$, $R^{11}$, $R^{18}$, $R^{19}$, $R^{20}$, $R^{21}$, and $R^{22}$ are each independently H, a $C_1$-$C_{20}$ alkyl, a $C_3$-$C_{20}$ cycloalkyl, a $C_6$-$C_{30}$ aryl, an aralkyl, or an alkaryl, and $R^{17}$ is H, a $C_1$-$C_{10}$ alkyl, or F. In some of such embodiments, p is 1 to 3. In one of such embodiments, p is 2. In one of such embodiments, p is 1.

In one or more embodiments of the compound of formula (1), $X^1$ is Cl.

In one embodiment of the compound of formula (1), wherein m=3, p=1, and n=2, the $R^1$ is independently selected from a —C≡$CR^7$, —C(O)$R^8$, —C(O)$OR^{10}$, —$SR^{11}$, —CS—$OR^{18}$, —$CSSR^{19}$, —$NR^{20}$C(O)—$CR^{21}$═$CR^{22}_2$ a $C_6$-$C_{20}$ aralkyl, or an alkaryl, where $R^7$, $R^8$, $R^{10}$, $R^{11}$, $R^{18}$, $R^{19}$, $R^{20}$, $R^{21}$, and $R^{22}$ are each independently H, a $C_1$-$C_{20}$ alkyl, a $C_3$-$C_{20}$ cycloalkyl, a $C_6$-$C_{30}$ aryl, an aralkyl, or an alkaryl, and $R^{17}$ is H, a $C_1$-$C_{10}$ alkyl, or F.

The organosilicon compound of formula (1) may include an organofunctional substituted silane, an organofunctional substituted halosilane, an organofunctional substituted alkyl halo silane, an organofunctional substituted alkyl silane, a halo silane, or a combination thereof. Some non-limiting examples of the organosilicon compound of formula (1) as synthesized by the present process are:

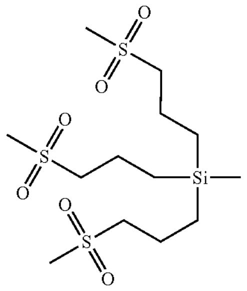
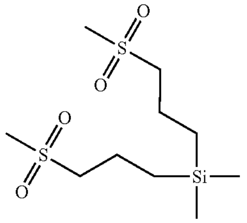
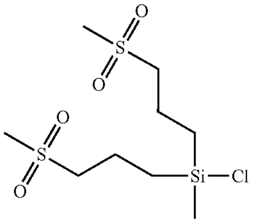
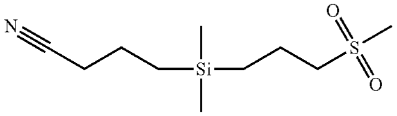
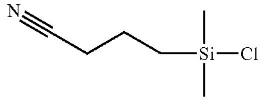
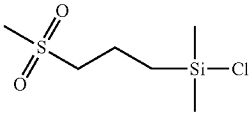
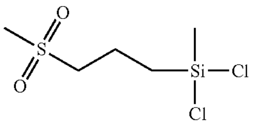
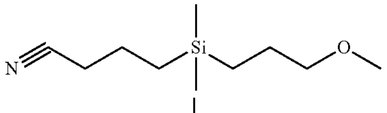
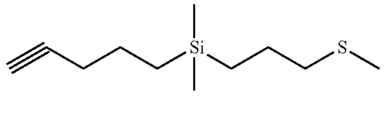

-continued

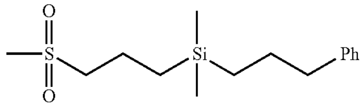
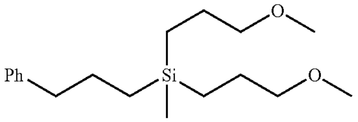
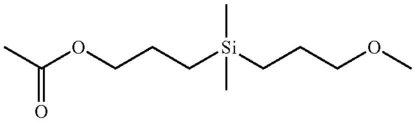

Aspects and embodiments of the process for forming organosilicon compounds can be further understood with respect to the following Examples. The Examples are for purposes of illustrating the embodiments and are not intended for the purpose of limiting the invention to such aspects or embodiments.

EXAMPLES

Example 1: Reaction of Chloropropyl Methanesulfone with Dimethyldichlorosilane in Presence of Zn/$ZnI_2$ and HMPA

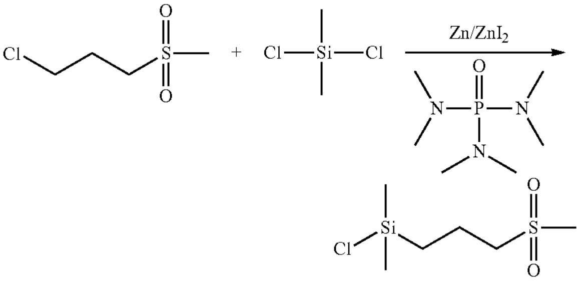

In a flask equipped with a condenser and dropping funnel, Zn-powder (4.6 g, 0.07 mol) and zinc iodide (1 g, 0.003 mol) were added to a mixture of hexamethylphosphoramide (23 mL) and toluene (27 mL) under $N_2$ atmosphere. Dimethyldichlorosilane (DMDCS) (12 g, 0.1 mol) was transferred via dropping funnel to the reaction mixture while stirring at room-temperature and slowly heated to 70° C. afterwards. Chloropropyl methanesulfone (10 g, 0.6 mol) was added at 70° C. over a period of 5 minutes and subsequently the mixture was heated for 24 hours at 100° C. A large amount of salt formation was observed indicating the formation of $ZnCl_2$ as byproduct. Complete conversion of DMDCS to functional chlorosilane was confirmed via $^1$H NMR. The product was isolated after filtering under $N_2$ atmosphere followed by vacuum distillation at 130° C. and 2 mbar pressure.

Comparative Example 1: Reaction of Chloropropyl Methanesulfone with Dimethyldichlorosilane in Presence of Mg in THF

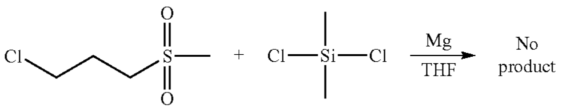

In a flask equipped with a condenser and dropping funnel, Mg-turnings (1.6 g, 0.07 mol) was added to anhydrous THF (50 mL) under $N_2$ atmosphere. Chloropropyl methanesulfone (10 g, 0.6 mol) was added dropwise to Magnesium after addition of 1 mL of Dibromoethane and Iodine crystals. The mixture was heated at 50° C. for 3 hours until most of Mg dissolved. Dimethyldichlorosilane (DMDCS) (12 g, 0.1 mol) was transferred via dropping funnel to the reaction mixture while stirring at 50° C., followed by subsequent heating at 75° C. for 24 hours. At this stage no solid precipitate of $MgCl_2$ was observed, $^1H$ NMR investigation confirmed no functional chlorosilane product formation.

Comparative Example 2: Reaction of Chloropropyl Methanesulfone with Dimethyldichlorosilane in Presence of Mg in 1,4-Dioxane

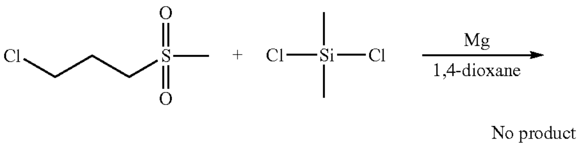

A similar reaction as Comparative Example 1 was performed in anhydrous 1,4-Dioxane at 100° C. without any product formation.

Comparative Example 3: Reaction of Chloropropyl Methanesulfone with Dimethyldichlorosilane in Presence of Mg/LiCl in 1,4-Dioxane

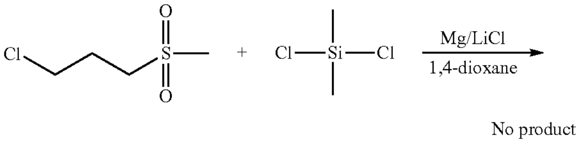

A similar experiment as Comparative Example 1 was performed in anhydrous 1,4-Dioxane at 100° C. in the presence of LiCl as promoter. No product was formed or isolated.

Comparative Example 4: Reaction of Chloropropyl Methanesulfone with Dimethyldichlorosilane in Presence of Mg and HMPA

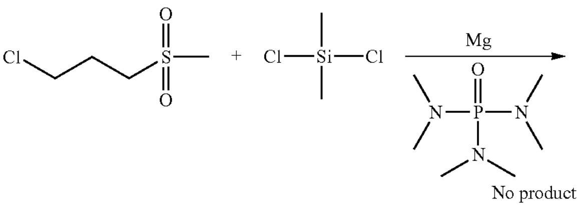

A similar experiment as Comparative Example 1 was performed in mixture of anhydrous 1,4-dioxane (27 ml) and HMPA (23 ml) at 100° C. No product was formed or isolated.

Comparative Example 5: Reaction of Chloropropyl Methanesulfone with Dimethyldichlorosilane in Presence of Mg/LiCl in HMPA

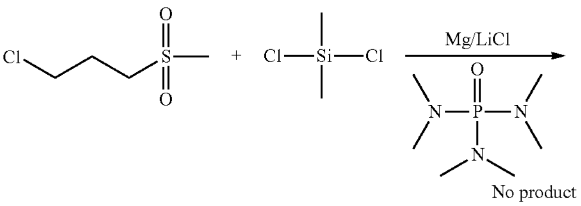

A similar experiment as Comparative Example 1 was performed in a mixture of anhydrous 1,4-dioxane (27 ml) and HMPA (23 ml) at 100° C. in the presence of LiCl as a catalyst. However, no product was formed or isolated.

Comparative Example 6: Reaction of Chloropropyl Methanesulfone with Dimethyldichlorosilane in Presence of Zn in THF

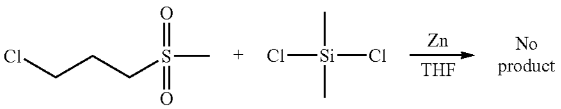

A similar experiment as Example 1 was performed in a mixture of anhydrous THF at 75° C. in the presence of Zinc and no halide catalyst. However, no product was formed or isolated.

Comparative Example 7: Reaction of Chloropropyl Methanesulfone with Dimethyldichlorosilane in Presence of Zinc in 1,4-dioxane

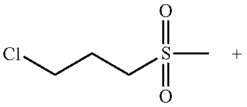

-continued

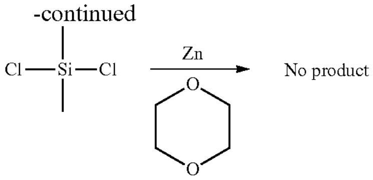

A similar experiment as Comparative Example 1 was performed in anhydrous 1,4-dioxane (50 ml) at 100° C. in the presence of Zinc. However, no product was formed or isolated.

Comparative Example 8: Reaction of Chloropropyl Methanesulfone with Dimethyldichlorosilane in Presence of $Zn/ZnI_2$ in 1,4-dioxane

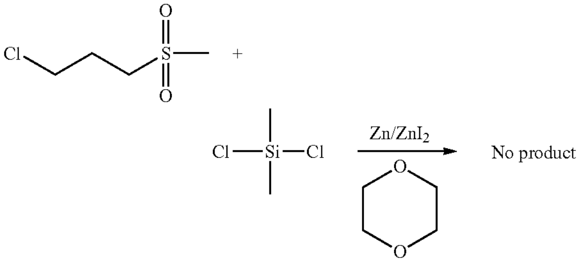

A similar experiment as Comparative Example 1 was performed in a mixture of anhydrous 1,4-dioxane (50 ml) at 100° C. in the presence of $Zn/ZnI_2$. However, no product was formed or isolated.

Comparative Example 9: Reaction of Chloropropyl Methanesulfone with Dimethyldichlorosilane in Presence of $Zn/ZnI_2$ in Dioxane/HMPA

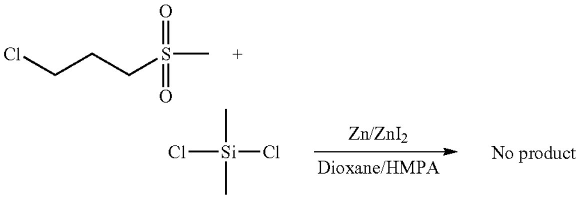

A similar experiment as Example 1 was performed in a mixture of anhydrous 1,4-dioxane (27 ml) and HMPA (23 ml) at 100° C. in the presence of $Zn/ZnI_2$. However, no product was formed or isolated.

Comparative Example 10: Reaction of Chloropropyl Methanesulfone with Dimethyldichlorosilane in Presence of Zn and HMPA

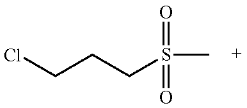

-continued

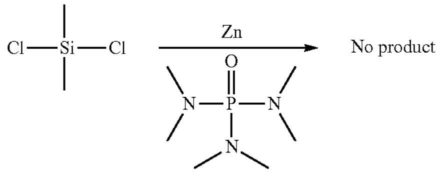

A similar experiment as Example 1 was performed in a mixture of toluene (27 ml) and HMPA (23 ml) at 100° C. in the presence of Zinc without any halide promoter. However, no product was formed or isolated.

Comparative Example 11: Reaction of Chloropropyl Methanesulfone with Dimethyldichlorosilane in Presence of $Zn/ZnCl_2$ in Absence of HMPA

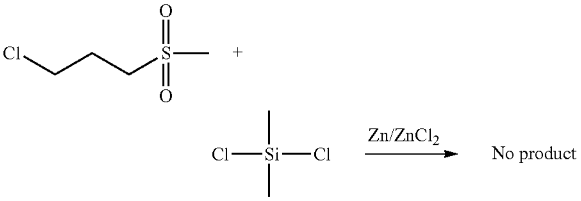

A similar experiment as Example 1 was performed in a mixture of anhydrous toluene (50 ml) in the presence of $Zn/ZnCl_2$. The reaction was performed in absence of HMPA. No product was formed or isolated.

Comparative Example 12: Reaction of Chloropropyl Methanesulfone with Dimethyldichlorosilane in Presence of $Zn/ZnI_2$ in Presence of DMI (Dimethylimidazolidione)

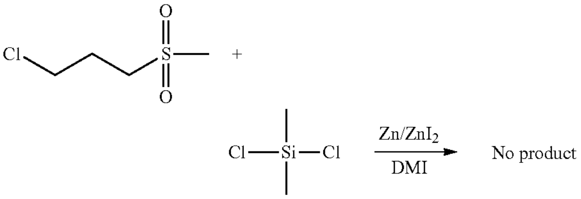

A similar experiment as Example 1 was performed in presence of DMI (50 ml) and $Zn/ZnI_2$. However, no product was formed or isolated.

Example 2: Synthesis of Bis-(methanesulfonyl propyl)-dimethylsilane

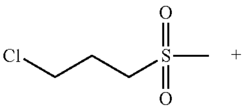

-continued

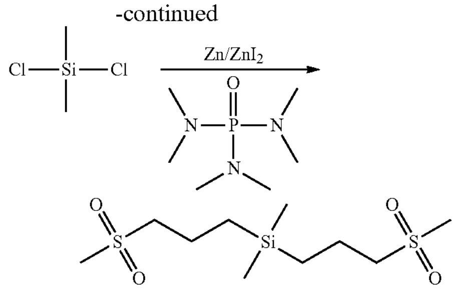

In a flask equipped with a condenser and dropping funnel, Zn-powder (4.3 g, 0.07 mol) and Zinc iodide (1 g, 0.003 mol) were added to a mixture of Hexamethylphosphoramide (23 mL) and Toluene (27 mL) under $N_2$ atmosphere. Dimethyldichlorosilane (DMDCS) (4 g, 0.03 mol) was transferred via a dropping funnel to the reaction mixture while stirring at room-temperature and slowly heated to 70° C. afterwards. Chloropropyl methanesulfone (10 g, 0.06 mol) was added at 70° C. over a period of 5 minutes and subsequently the mixture was heated for 24 hours at 100° C. A large amount of salt formation was observed indicating the formation of $ZnCl_2$ as byproduct. Complete conversion of DMDCS to functional chlorosilane was confirmed via $^1H$ NMR. The product was isolated after filtering under $N_2$ atmosphere followed by vacuum distillation at 160° C. and 2 mbar pressure.

Example 3: Synthesis of (Methanesulfonyl propyl)-methyldichlorosilane

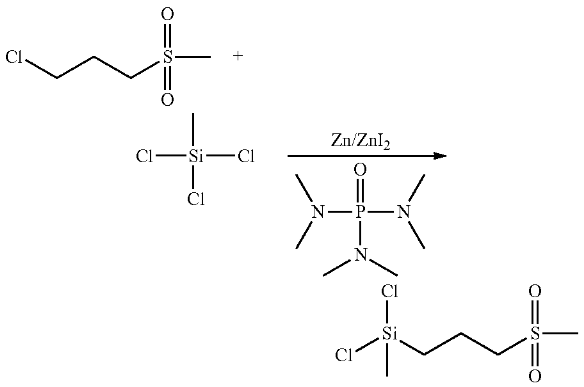

In a flask equipped with a condenser and dropping funnel, Zn-powder (4.3 g, 0.07 mol) and Zinc iodide (1 g, 0.003 mol) were added to a mixture of Hexamethylphosphoramide (23 mL) and Toluene (27 mL) under $N_2$ atmosphere. Methyltrichlorosilane (MTCS) (10 g, 0.06 mol) was transferred via a dropping funnel to the reaction mixture while stirring at room-temperature and slowly heated to 70° C. afterwards. Chloropropyl methanesulfone (10 g, 0.06 mol) was added at 70° C. over a period of 5 minutes and subsequently the mixture was heated for 24 hours at 100° C. A large amount of salt formation was observed indicating formation of $ZnCl_2$ as byproduct. Complete conversion of MTCS to functional chlorosilane was confirmed via $^1H$ NMR. The product was isolated after filtering under $N_2$ atmosphere followed by vacuum distillation.

Example 4: Synthesis of Bis-(methanesulfonyl propyl)-methylchlorosilane

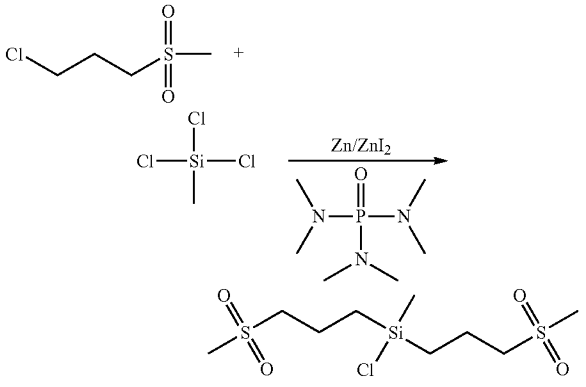

In a flask equipped with a condenser and dropping funnel, Zn-powder (4.3 g, 0.07 mol) and Zinc iodide (1 g, 0.003 mol) were added to a mixture of Hexamethylphosphoramide (23 mL) and Toluene (27 mL) under $N_2$ atmosphere. Methyltrichlorosilane (MTCS) (5 g, 0.03 mol) was transferred via a dropping funnel to the reaction mixture while stirring at room-temperature and slowly heated to 70° C. afterwards. Chloropropyl methanesulfone (10 g, 0.06 mol) was added at 70° C. over a period of 5 minutes and subsequently the mixture was heated for 24 hours at 100° C. A large amount of salt formation was observed indicating the formation of $ZnCl_2$ as byproduct. Complete conversion of MTCS to difunctional chlorosilane was confirmed via $^1H$ NMR. The product was isolated after filtering under $N_2$ atmosphere followed by vacuum distillation.

Example 5: Synthesis of tris-(methanesulfonyl propyl)-methylsilane

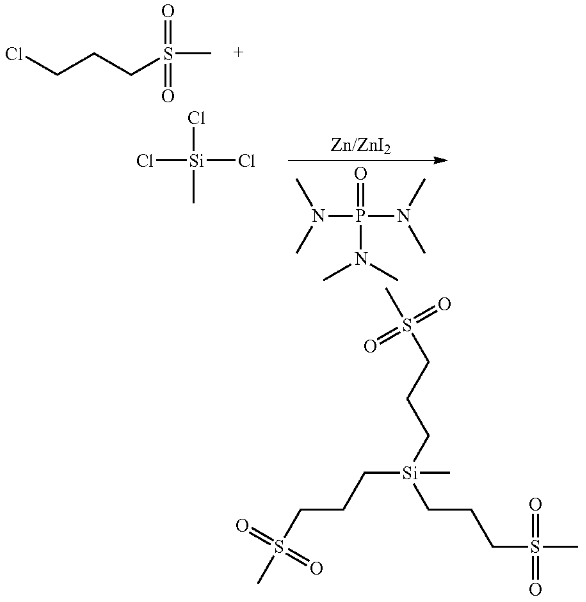

In a flask equipped with a condenser and dropping funnel, Zn-powder (6.9 g, 0.11 mol) and Zinc iodide (1.5 g, 0.005 mol) were added to a mixture of Hexamethylphosphoramide (33 mL) and Toluene (27 mL) under $N_2$ atmosphere. Methyltrichlorosilane (MTCS) (4 g, 0.03 mol) was transferred via a dropping funnel to the reaction mixture while stirring at room-temperature and slowly heated to 70° C. afterwards. Chloropropyl methanesulfone (10 g, 0.06 mol) was added at 70° C. over a period of 5 minutes and subsequently the mixture was heated for 24 hours at 100° C. A large amount of salt formation was observed indicating the formation of $ZnCl_2$ as byproduct. Complete conversion of MTCS to trifunctional silane was confirmed via $^1H$ NMR. The product was isolated after filtering under $N_2$ atmosphere followed by vacuum distillation.

Example 6: Synthesis of Nitrilopropyl-dimethylchlorosilane

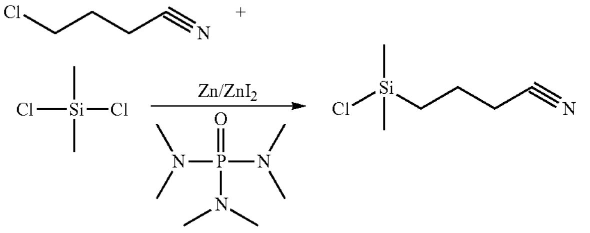

In a flask equipped with a condenser and dropping funnel, Zn-powder (6.4 g, 0.1 mol) and Zinc iodide (1.6 g, 0.005 mol) were added to a mixture of Hexamethylphosphoramide (34 mL) and Toluene (41 mL) under $N_2$ atmosphere. DMDCS (12 g, 0.1 mol) was transferred via dropping funnel to the reaction mixture while stirring at room-temperature and slowly heated to 70° C. afterwards. Chloropropyl nitrile (10 g, 0.1 mol) was added at 70° C. over a period of 5 minutes and subsequently the mixture was heated for 24 hours at 100° C. A large amount of salt formation was observed indicating formation of $ZnCl_2$ as byproduct. Complete conversion of DMDCS to functional chlorosilane was confirmed via $^1H$ NMR. The product was isolated after filtering under $N_2$ atmosphere followed by vacuum distillation.

Example 7: Synthesis of Nitrilopropyl-methanesulfonylpropyl-dimethylsilane

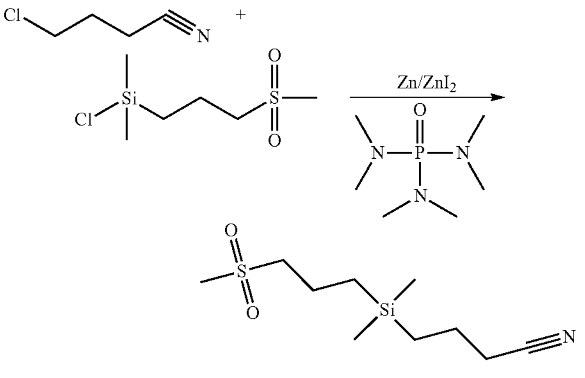

In a flask equipped with a condenser and dropping funnel, Zn-powder (6.4 g, 0.1 mol), Zinc iodide (1.6 g, 0.005 mol) were added to a mixture of Hexamethylphosphoramide (34 mL) and Toluene (41 mL) under $N_2$ atmosphere. Methanesulfonylpropyl-dimethylchlorosilane (21 g, 0.1 mol) was transferred via dropping funnel to reaction mixture while stirring at room-temperature and slowly heated to 70° C. afterwards. Chloropropyl nitrile (10 g, 0.1 mol) was added at 70° C. over a period of 5 minutes and subsequently the mixture was heated for 24 h at 100° C. Large amount of salt formation was observed indicating formation of $ZnCl_2$ as byproduct. Complete conversion of Chlorosilane to functional chlorosilane was confirmed via $^1H$ NMR. The product was isolated after filtering under $N_2$ atmosphere followed by vacuum distillation.

Example 8: Reaction of Chloropropyl Methanesulfone with Dimethyldichlorosilane in Presence of $Zn/ZnI_2$ and TPPO

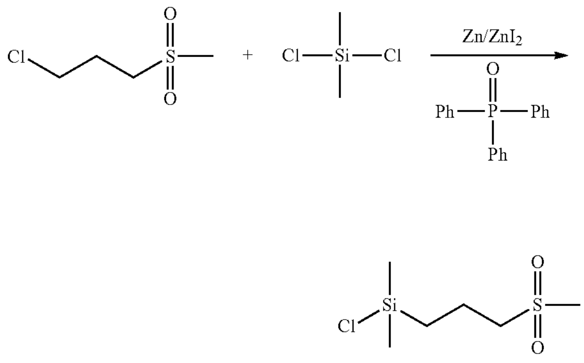

In a flask equipped with a condenser and dropping funnel, Zn-powder (4.3 g, 0.07 mol), Zinc iodide (1 g, 0.003 mol) were added to a mixture of Triphenylphosphine oxide (36.5 g) and Toluene (27 mL) under $N_2$ atmosphere. Dimethyldichlorosilane (DMDCS) (12 g, 0.1 mol) was transferred via dropping funnel to reaction mixture while stirring at room-temperature and slowly heated to 70° C. afterwards. Chloropropyl methanesulfone (10 g, 0.06 mol) was added at 70° C. over a period of 5 minutes and subsequently the mixture was heated for 24 h at 100° C. A large amount of salt formation was observed indicating the formation of $ZnCl_2$ as byproduct. Complete conversion of DMDCS to functional chlorosilane was confirmed via $^1H$ NMR. The product was isolated after filtering under $N_2$ atmosphere followed by vacuum distillation.

Example 9: Reaction of Chloropropyl Methanesulfone with Dimethyldichlorosilane in Presence of $Zn/ZnI_2$ and TOPO

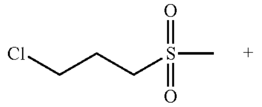

-continued

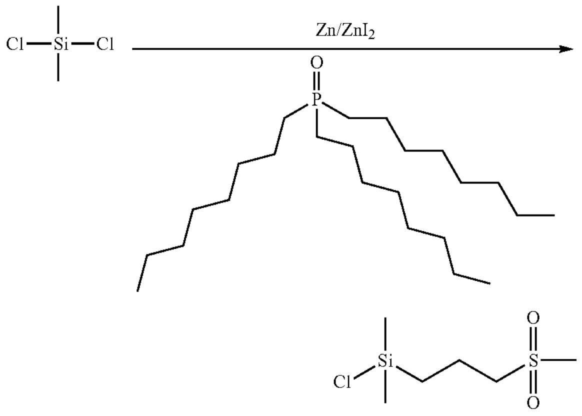

In a flask equipped with a condenser and dropping funnel, Zn-powder (4.3 g, 0.07 mol) and Zinc iodide (1 g, 0.003 mol) were added to a mixture of Trioctylphosphine oxide (60 g) and Toluene (27 mL) under $N_2$ atmosphere. Dimethyldichlorosilane (DMDCS) (12 g, 0.1 mol) was transferred via dropping funnel to the reaction mixture while stirring at room-temperature and slowly heated to 70° C. afterwards. Chloropropyl methanesulfone (10 g, 0.06 mol) was added at 70° C. over a period of 5 minutes and subsequently the mixture was heated for 24 hours at 100° C. A large amount of salt formation was observed indicating formation of $ZnCl_2$ as byproduct. Complete conversion of DMDCS to functional chlorosilane was confirmed via $^1H$ NMR. The product was isolated after filtering under $N_2$ atmosphere followed by vacuum distillation.

Example 10: Reaction of Chloropropyl Methanesulfone with Dimethyldichlorosilane in Presence of Zn/LiI and HMPA

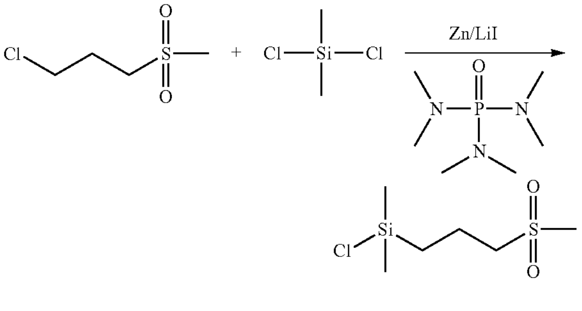

In a flask equipped with a condenser and dropping funnel, Zn-powder (4.6 g, 0.07 mol) and lithium iodide (0.9 g, 0.006 mol) were added to a mixture of hexamethylphosphoramide (23 mL) and toluene (27 mL) under $N_2$ atmosphere. Dimethyldichlorosilane (DMDCS) (12 g, 0.1 mol) was transferred via dropping funnel to the reaction mixture while stirring at room-temperature and slowly heated to 70° C. afterwards. Chloropropyl methanesulfone (10 g, 0.06 mol) was added at 70° C. over a period of 5 minutes and subsequently the mixture was heated for 24 hours at 100° C. Complete conversion of DMDCS to functional chlorosilane was confirmed via $^1H$ NMR.

Example 11: Reaction of Chloropropyl Methanesulfone with Dimethyldichlorosilane in Presence of Zn/KI and HMPA

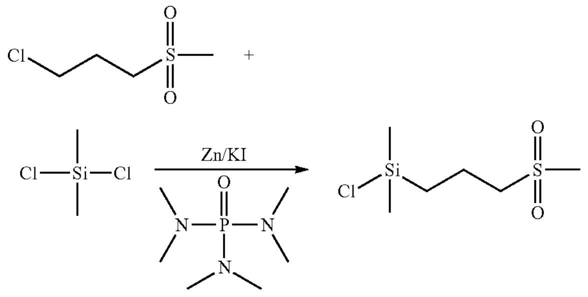

In a flask equipped with a condenser and dropping funnel, Zn-powder (4.6 g, 0.07 mol) and potassium iodide (1.1 g, 0.006 mol) were added to a mixture of hexamethylphosphoramide (23 mL) and toluene (27 mL) under $N_2$ atmosphere. Dimethyldichlorosilane (DMDCS) (12 g, 0.1 mol) was transferred via dropping funnel to the reaction mixture while stirring at room-temperature and slowly heated to 70° C. afterwards. Chloropropyl methanesulfone (10 g, 0.06 mol) was added at 70° C. over a period of 5 minutes and subsequently the mixture was heated for 24 hours at 100° C. Complete conversion of DMDCS to functional chlorosilane was confirmed via $^1H$ NMR.

Example 12: Reaction of Chloropropyl Methanesulfone with Dimethyldichlorosilane in Presence of Zn/NaI and HMPA

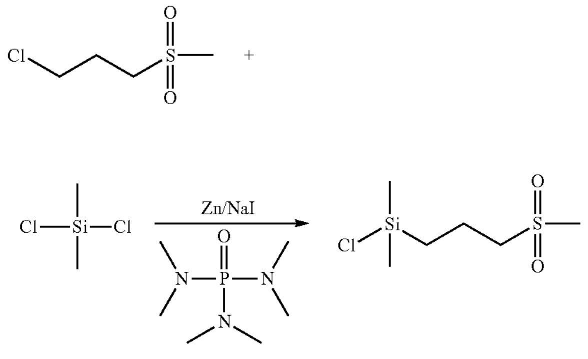

In a flask equipped with a condenser and dropping funnel, Zn-powder (4.6 g, 0.07 mol) and sodium iodide (1.0 g, 0.006 mol) were added to a mixture of hexamethylphosphoramide (23 mL) and toluene (27 mL) under $N_2$ atmosphere. Dimethyldichlorosilane (DMDCS) (12 g, 0.1 mol) was transferred via dropping funnel to the reaction mixture while stirring at room-temperature and slowly heated to 70° C. afterwards. Chloropropyl methanesulfone (10 g, 0.06 mol) was added at 70° C. over a period of 5 minutes and subsequently the mixture was heated for 24 hours at 100° C. Complete conversion of DMDCS to functional chlorosilane was confirmed via $^1H$ NMR.

Example 13: Synthesis of Methoxypropyl-dimethylchlorosilane

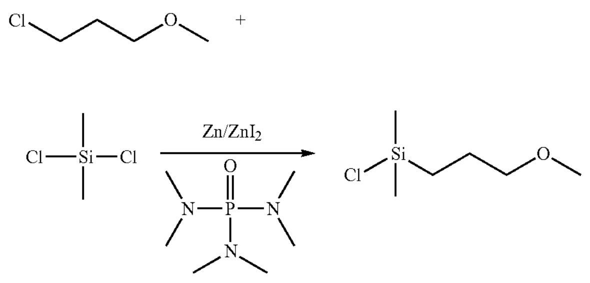

In a flask equipped with a condenser and dropping funnel, Zn-powder (6.0 g, 0.09 mol) and Zinc iodide (0.3 g, 0.001 mol) were added to a mixture of Hexamethylphosphoramide (32 ml) and Toluene (68 ml) under $N_2$ atmosphere. DMDCS (18 g, 0.14 mol) was transferred via dropping funnel to the reaction mixture while stirring at room-temperature and slowly heated to 70° C. afterwards. 1-Chloro-3-methoxy propane (10 g, 0.09 mol) was added at 70° C. over a period of 5 minutes and subsequently the mixture was heated for 24 hours at 100° C. A large amount of salt formation was observed indicating formation of $ZnCl_2$ as byproduct. Complete conversion of DMDCS to functional chlorosilane was confirmed via $^1$H NMR.

Example 14: Synthesis of 3-acetoxypropyl dimethylchlorosilane

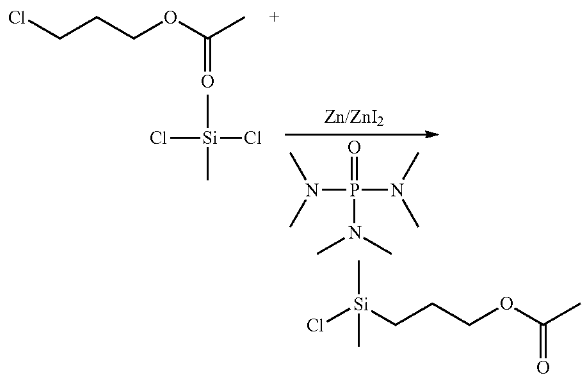

In a flask equipped with a condenser and dropping funnel, Zn-powder (4.8 g, 0.07 mol) and Zinc iodide (0.2 g, 0.001 mol) were added to a mixture of Hexamethylphosphoramide (25 ml) and Toluene (75 ml) under $N_2$ atmosphere. DMDCS (14 g, 0.11 mol) was transferred via dropping funnel to the reaction mixture while stirring at room-temperature and slowly heated to 70° C. afterwards. 3-Chloropropyl acetate (10 g, 0.07 mol) was added at 70° C. over a period of 5 minutes and subsequently the mixture was heated for 24 hours at 100° C. A large amount of salt formation was observed indicating formation of $ZnCl_2$ as byproduct. Complete conversion of DMDCS to functional chlorosilane was confirmed via $^1$H NMR.

Example 15: Synthesis of Phenylpropyl-dimethylchlorosilane

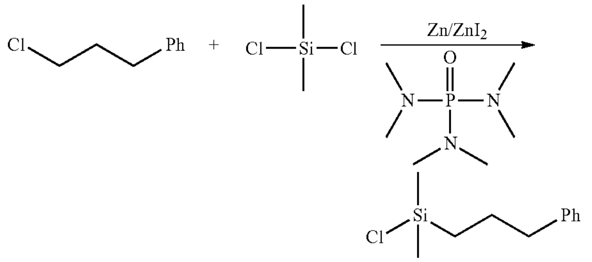

In a flask equipped with a condenser and dropping funnel, Zn-powder (4.2 g, 0.06 mol) and Zinc iodide (0.2 g, 0.001 mol) were added to a mixture of Hexamethylphosphoramide (23 ml) and Toluene (77 ml) under $N_2$ atmosphere. DMDCS (13 g, 0.10 mol) was transferred via dropping funnel to the reaction mixture while stirring at room-temperature and slowly heated to 70° C. afterwards. Phenylpropyl chloride (10 g, 0.06 mol) was added at 70° C. over a period of 5 minutes and subsequently the mixture was heated for 24 hours at 100° C. A large amount of salt formation was observed indicating formation of $ZnCl_2$ as byproduct. Complete conversion of DMDCS to functional chlorosilane was confirmed via $^1$H NMR.

Example 16: Synthesis of Pentynyl-dimethylchlorosilane

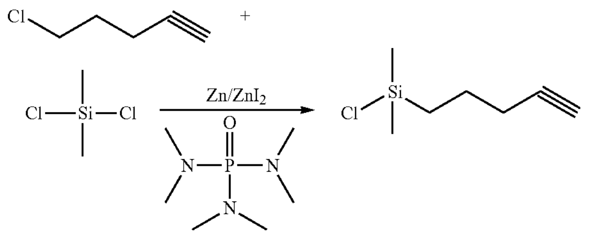

In a flask equipped with a condenser and dropping funnel, Zn-powder (6.4 g, 0.1 mol) and Zinc iodide (0.3 g, 0.001 mol) were added to a mixture of Hexamethylphosphoramide (34 ml) and Toluene (66 ml) under $N_2$ atmosphere. DMDCS (19 g, 0.15 mol) was transferred via dropping funnel to the reaction mixture while stirring at room-temperature and slowly heated to 70° C. afterwards. 5-Chloro-1-pentyne (10 g, 0.1 mol) was added at 70° C. over a period of 5 minutes and subsequently the mixture was heated for 24 hours at 100° C. A large amount of salt formation was observed indicating formation of $ZnCl_2$ as byproduct. Complete conversion of DMDCS to functional chlorosilane was confirmed via $^1$H NMR.

Example 17: Synthesis of 3-(chlorodimethylsilyl)propyl thioacetate

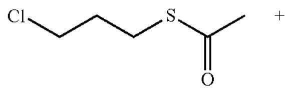

-continued

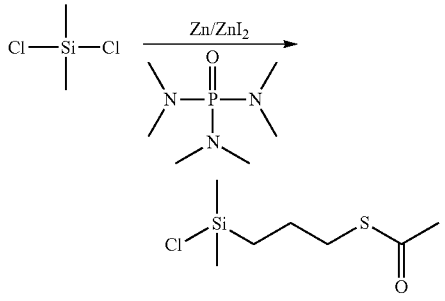

In a flask equipped with a condenser and dropping funnel, Zn-powder (4.3 g, 0.07 mol) and Zinc iodide (0.2 g, 0.001 mol) were added to a mixture of Hexamethylphosphoramide (23 ml) and Toluene (77 ml) under $N_2$ atmosphere. DMDCS (13 g, 0.10 mol) was transferred via dropping funnel to the reaction mixture while stirring at room-temperature and slowly heated to 70° C. afterwards. 3-Chloropropyl thioacetate (10 g, 0.07 mol) was added at 70° C. over a period of 5 minutes and subsequently the mixture was heated for 24 hours at 100° C. A large amount of salt formation was observed indicating formation of $ZnCl_2$ as byproduct. Complete conversion of DMDCS to functional chlorosilane was confirmed via $^1H$ NMR.

Example 18: Synthesis of 3-(methylsulfanyl)propyl dimethylchlorosilane

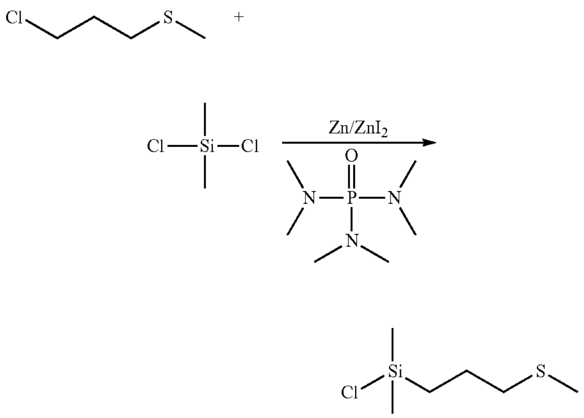

In a flask equipped with a condenser and dropping funnel, Zn-powder (5.3 g, 0.08 mol) and Zinc iodide (0.3 g, 0.001 mol) were added to a mixture of Hexamethylphosphoramide (28 ml) and Toluene (72 ml) under $N_2$ atmosphere. DMDCS (16 g, 0.12 mol) was transferred via dropping funnel to the reaction mixture while stirring at room-temperature and slowly heated to 70° C. afterwards. 3-Chloropropyl methylsulfane (10 g, 0.08 mol) was added at 70° C. over a period of 5 minutes and subsequently the mixture was heated for 24 hours at 100° C. A large amount of salt formation was observed indicating formation of $ZnCl_2$ as byproduct. Complete conversion of DMDCS to functional chlorosilane was confirmed via $^1H$ NMR.

Example 19: Synthesis of 5-Chloropropyldimethylchlorosilane

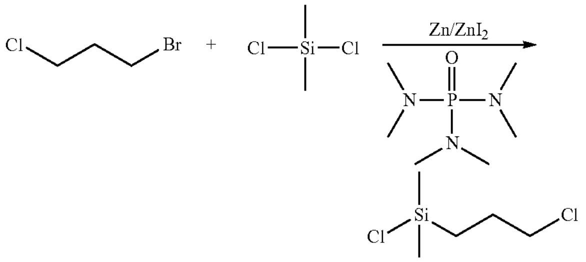

In a flask equipped with a condenser and dropping funnel, Zn-powder (3.5 g, 0.05 mol) and Zinc iodide (0.2 g, 0.001 mol) were added to a mixture of Hexamethylphosphoramide (19 ml) and Toluene (50 ml) under $N_2$ atmosphere. DMDCS (10 g, 0.08 mol) was transferred via dropping funnel to the reaction mixture while stirring at room-temperature and slowly heated to 70° C. afterwards. 1-Bromo-3-Chloropropane (10 g, 0.05 mol) was added at 70° C. over a period of 5 minutes and subsequently the mixture was heated for 24 hours at 100° C. A large amount of salt formation was observed indicating formation of $ZnBr_2$ as byproduct. Complete conversion of DMDCS to functional chlorosilane was confirmed via $^1H$ NMR.

Example 20: Synthesis of Methoxypropyl-nitrilopropyl-dimethylsilane

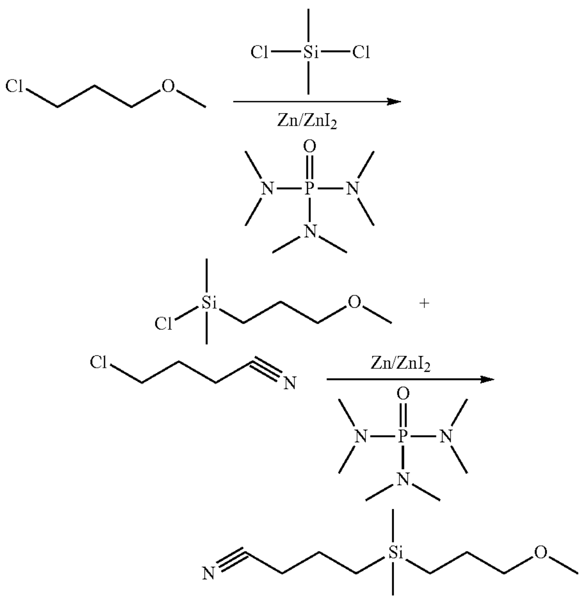

In a flask equipped with a condenser and dropping funnel, Zn-powder (6.3 g, 0.1 mol) and Zinc iodide (0.3 g, 0.001 mol) were added to a mixture of Hexamethylphosphoramide (34 ml) and Toluene (50 ml) under $N_2$ atmosphere. DMDCS (19 g, 0.15 mol) was transferred via dropping funnel to the reaction mixture while stirring at room-temperature and slowly heated to 70° C. afterwards. Chloromethoxypropane (10.5 g, 0.1 mol) was added at 70° C. over a period of 5 minutes and subsequently the mixture was heated for 24 hours at 100° C. The reaction was subsequently cooled down. Another batch of Zn-powder (6.3 g, 0.1 mol) and Zinc iodide (0.3 g, 0.001 mol) were added along with Hexamethylphosphoramide (34 ml) and Toluene (50 ml) under $N_2$ atmosphere. The reaction mixture was slowly heated to 70° C. afterwards. 4-Chlorobutyronitrile (10 g, 0.10 mol) was added at 70° C. over a period of 5 minutes and subsequently the mixture was heated for 24 hours at 100° C. A large amount of salt formation was observed indicating formation of $ZnCl_2$ as byproduct. Formation of difunctional silane was confirmed via $^1$H NMR.

Example 21: Synthesis of Pentynyl-3-(methylsulfanyl)propyl dimethylsilane

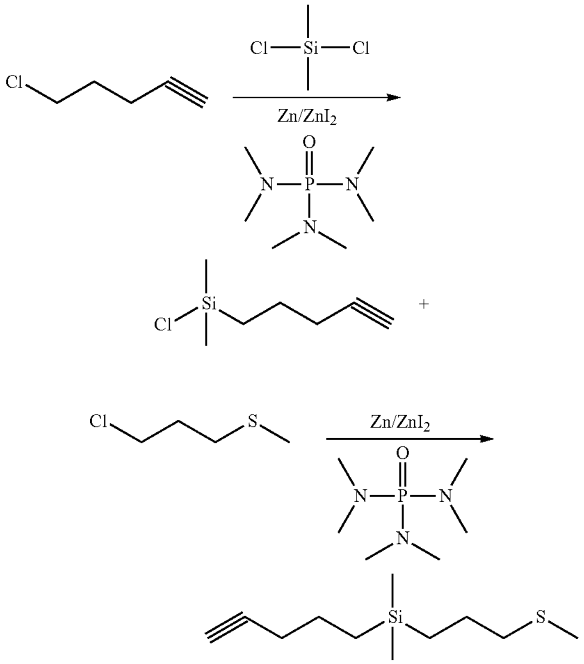

In a flask equipped with a condenser and dropping funnel, Zn-powder (6.4 g, 0.1 mol) and Zinc iodide (0.3 g, 0.001 mol) were added to a mixture of Hexamethylphosphoramide (35 ml) and Toluene (50 ml) under $N_2$ atmosphere. DMDCS (19 g, 0.15 mol) was transferred via dropping funnel to the reaction mixture while stirring at room-temperature and slowly heated to 70° C. afterwards. 5-Chloropentyne (10 g, 0.10 mol) was added at 70° C. over a period of 5 minutes and subsequently the mixture was heated for 24 hours at 100° C. The reaction was subsequently cooled down. Another batch of Zn-powder (6.4 g, 0.1 mol) and Zinc iodide (0.3 g, 0.001 mol) were added along with Hexamethylphosphoramide (35 ml) and Toluene (50 ml) under $N_2$ atmosphere. The reaction mixture was slowly heated to 70° C. afterwards. Chloropropyl methyl sulfane (12.1 g, 0.1 mol) was added at 70° C. over a period of 5 minutes and subsequently the mixture was heated for 24 hours at 100° C. A large amount of salt formation was observed indicating formation of $ZnCl_2$ as byproduct. Formation of difunctional silane was confirmed via $^1$H NMR.

Example 22: Synthesis of 3-Acetoxypropyl 3-methoxypropyl dimethylsilane

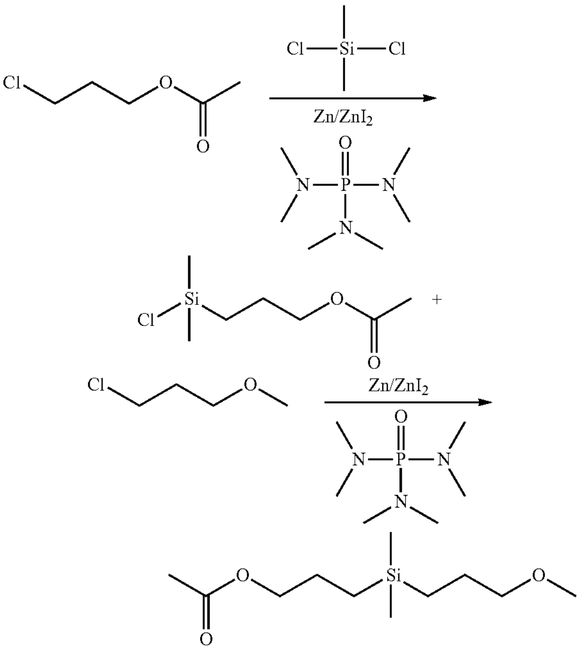

In a flask equipped with a condenser and dropping funnel, Zn-powder (4.8 g, 0.07 mol) and Zinc iodide (0.25 g, 0.001 mol) were added to a mixture of Hexamethylphosphoramide (26 ml) and Toluene (50 ml) under $N_2$ atmosphere. DMDCS (14 g, 0.11 mol) was transferred via dropping funnel to the reaction mixture while stirring at room-temperature and slowly heated to 70° C. afterwards. Chloropropyl actetate (10 g, 0.07 mol) was added at 70° C. over a period of 5 minutes and subsequently the mixture was heated for 24 hours at 100° C. The reaction was subsequently cooled down. Another batch of Zn-powder (4.8 g, 0.07 mol) and Zinc iodide (0.25 g, 0.001 mol) were added along with Hexamethylphosphoramide (26 ml) and Toluene (50 ml) under $N_2$ atmosphere. The reaction mixture was slowly heated to 70° C. afterwards. 1-Chloro-3-methoxypropane (7.9 g, 0.07 mol) was added at 70° C. over a period of 5 minutes and subsequently the mixture was heated for 24 hours at 100° C. A large amount of salt formation was observed indicating formation of $ZnCl_2$ as byproduct. Formation of difunctional silane was confirmed via $^1$H NMR and GCMS.

Example 23: Synthesis of 3-Phenylpropyl 3-(methylsulfonyl)propyl dimethylsilane

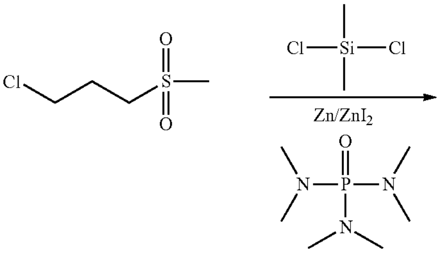

-continued

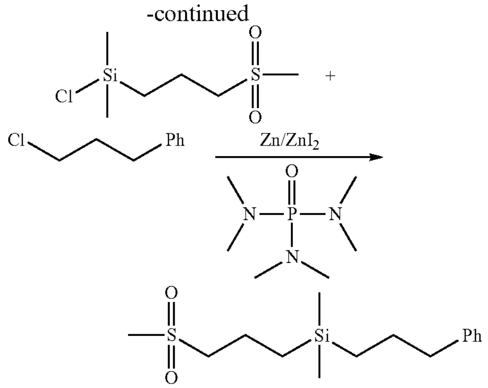

In a flask equipped with a condenser and dropping funnel, Zn-powder (4.3 g, 0.06 mol) and Zinc iodide (0.2 g, 0.001 mol) were added to a mixture of Hexamethylphosphoramide (23 ml) and Toluene (50 ml) under $N_2$ atmosphere. DMDCS (19 g, 0.15 mol) was transferred via dropping funnel to the reaction mixture while stirring at room-temperature and slowly heated to 70° C. afterwards. Chloropropyl methyl sulfone (10.1 g, 0.06 mol) was added at 70° C. over a period of 5 minutes and subsequently the mixture was heated for 24 hours at 100° C. The reaction was subsequently cooled down. Another batch of Zn-powder (4.3 g, 0.06 mol) and Zinc iodide (0.2 g, 0.001 mol) were added along with Hexamethylphosphoramide (23 ml) and Toluene (50 ml) under $N_2$ atmosphere. The reaction mixture was slowly heated to 70° C. afterwards. Phenyl propyl chloride (10 g, 0.06 mol) was added at 70° C. over a period of 5 minutes and subsequently the mixture was heated for 24 hours at 100° C. A large amount of salt formation was observed indicating formation of $ZnCl_2$ as byproduct. Formation of difunctional silane was confirmed via $^1$H NMR and GCMS.

Example 24: Synthesis of 3-Phenylpropyl di(methoxypropyl) methylsilane

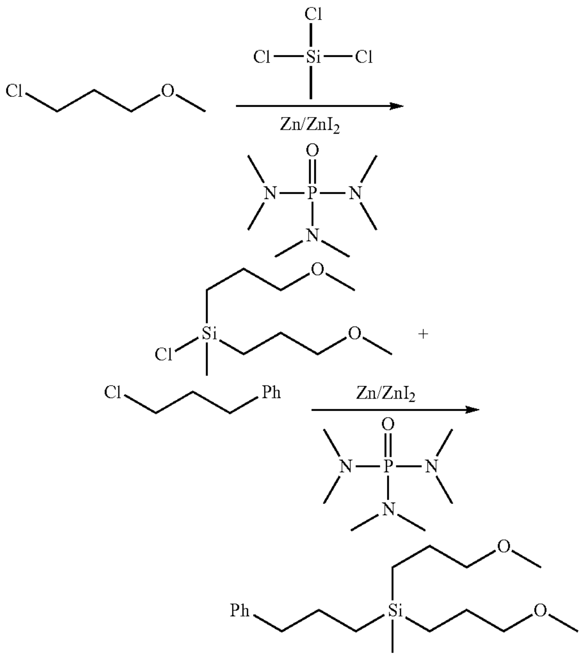

In a flask equipped with a condenser and dropping funnel, Zn-powder (8.5 g, 0.13 mol) and Zinc iodide (0.4 g, 0.002 mol) were added to a mixture of Hexamethylphosphoramide (45 ml) and Toluene (50 ml) under $N_2$ atmosphere. Trichloromethylsilane (11 g, 0.07 mol) was transferred via dropping funnel to the reaction mixture while stirring at room-temperature and slowly heated to 70° C. afterwards. 1-chloro-3-methoxypropane (14 g, 0.13 mol) was added at 70° C. over a period of 5 minutes and subsequently the mixture was heated for 24 hours at 100° C. The reaction was subsequently cooled down. Another batch of Zn-powder (4.3 g, 0.06 mol) and Zinc iodide (0.2 g, 0.001 mol) were added along with Hexamethylphosphoramide (23 ml) and Toluene (50 ml) under $N_2$ atmosphere. The reaction mixture was slowly heated to 70° C. afterwards. Phenyl propyl chloride (10 g, 0.06 mol) was added at 70° C. over a period of 5 minutes and subsequently the mixture was heated for 24 hours at 100° C. A large amount of salt formation was observed indicating formation of $ZnCl_2$ as byproduct. Formation of trifunctional silane was confirmed via $^1$H NMR and GCMS.

Example 25: Reaction of Chloropropyl Methanesulfone with Dimethyldichlorosilane in Presence of $Zn/ZnI_2$ and HMPA (Without any Additional Solvent)

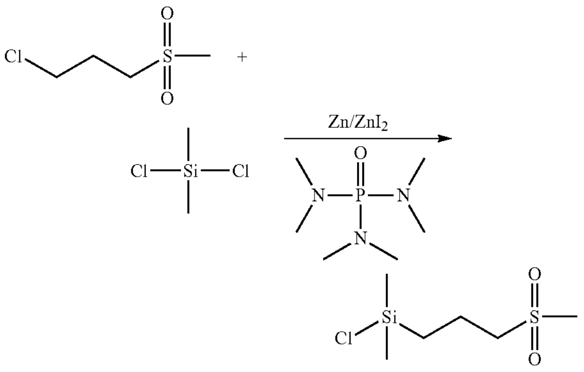

In a flask equipped with a condenser and dropping funnel, Zn-powder (4.6 g, 0.07 mol) and zinc iodide (1 g, 0.003 mol) were added hexamethylphosphoramide (50 mL) under $N_2$ atmosphere. Dimethyldichlorosilane (DMDCS) (12 g, 0.1 mol) was transferred via dropping funnel to the reaction mixture while stirring at room-temperature and slowly heated to 70° C. afterwards. Chloropropyl methanesulfone (10 g, 0.6 mol) was added at 70° C. over a period of 5 minutes and subsequently the mixture was heated for 24 hours at 100° C. A large amount of salt formation was observed indicating the formation of $ZnCl_2$ as byproduct. Complete conversion of DMDCS to functional chlorosilane was confirmed via $^1$H NMR. The product was isolated after filtering under $N_2$ atmosphere followed by vacuum distillation at 130° C. and 2 mbar pressure. In this example, only HMPA was used, which functions as a promoter as well as a solvent and the desired product was formed successfully. Therefore, it is evident from this example that a promoter can also be used as a non-reactive solvent for this process.

Examples of reactions for forming organofunctional silanes are shown in Table 1. The examples designated with a "C" are comparative examples.

TABLE 1

| Example No. | Alkyl Halide | Chlorosilane | Metal | Catalyst | Promoter | Product |
|---|---|---|---|---|---|---|
| C1 | 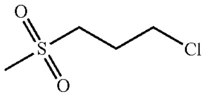 | 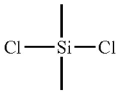 | Mg | — | — | No Product formed/isolated |
| C2 | 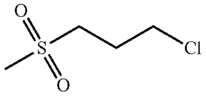 | 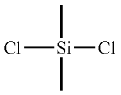 | Mg | LiCl | — | No Product formed/isolated |
| C3 | 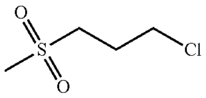 | 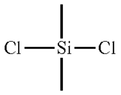 | Mg | — | HMPA | No Product formed/isolated |
| C4 | 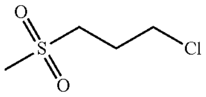 | 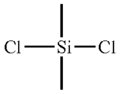 | Mg | LiCl | HMPA | No Product formed/isolated |
| C5 | 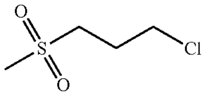 | 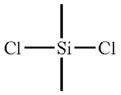 | Zn | — | — | No Product formed/isolated |
| C6 | 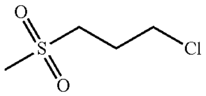 | 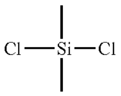 | Zn | ZnI2 | — | No Product formed/isolated |
| C7 | 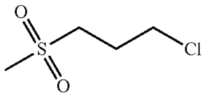 | 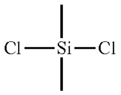 | Zn | — | HMPA | No Product formed/isolated |
| 1 | 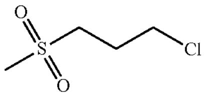 (1 mol) | 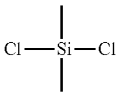 (1 mol) | Zn (1 mol) | ZnI2 | HMPA | 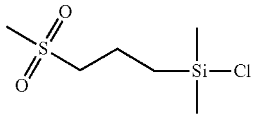 |
| 2 | 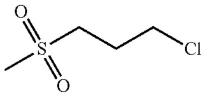 (2 mol) | 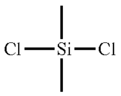 (1 mol) | Zn (2 mol) | ZnI2 | HMPA | 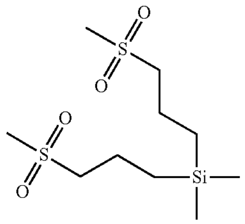 |
| 3 | 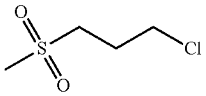 (1 mol) | 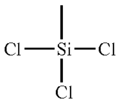 (1 mol) | Zn (1 mol) | ZnI2 | HMPA | 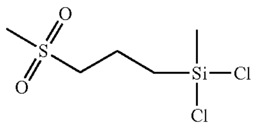 |
| 4 | 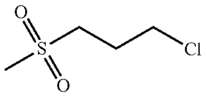 (2 mol) | 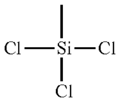 (1 mol) | Zn (2 mol) | ZnI2 | HMPA | 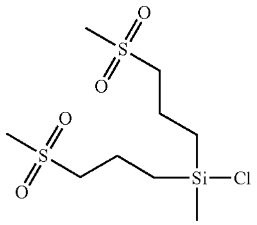 [SMILES: C[Si](Cl)(CCCS(C)(=O)=O)CCCS(C)(=O)=O] |

TABLE 1-continued
| Example No. | Alkyl Halide | Chlorosilane | Metal | Catalyst | Promoter | Product |
|---|---|---|---|---|---|---|
| 5 | 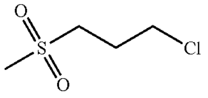 (3 mol) | 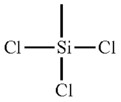 (1 mol) | Zn (3 mol) | ZnI2 | HMPA | 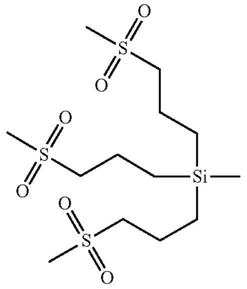 |
| 6 | 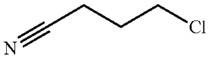 (1 mol) | 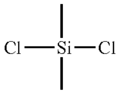 (1 mol) | Zn (1 mol) | ZnI2 | HMPA | 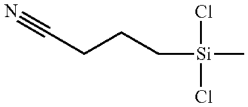 |
| 7 | 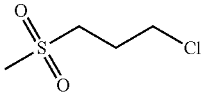 (1 mol) | 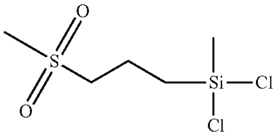 (1 mol) | Zn (1 mol) | ZnI2 | HMPA | 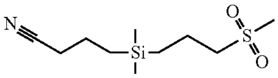 |
| 8 | 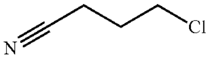 (1 mol) | 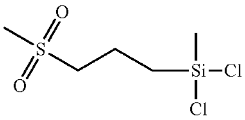 (1 mol) | Zn (1 mol) | ZnI2 | HMPA | 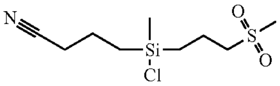 |
| 9 | 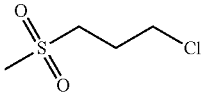 (1 mol) | 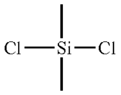 (1 mol) | Zn (1 mol) | ZnI2 | TPPO | 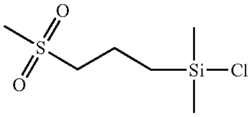 |
| 10 | 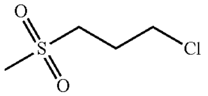 (1 mol) | 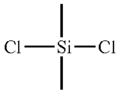 (1 mol) | Zn (1 mol) | ZnI2 | TOPO | 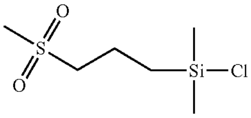 |
| 11 | 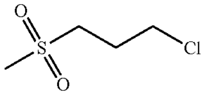 (1 mol) | 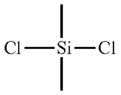 (1 mol) | Zn (1 mol) | LiI | HMPA | 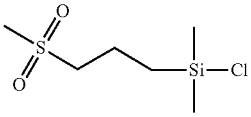 |
| 12 | 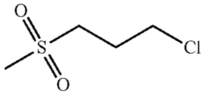 (1 mol) | 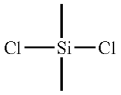 (1 mol) | Zn (1 mol) | NaI | HMPA | 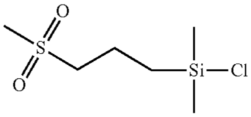 |

TABLE 1-continued

| Example No. | Alkyl Halide | Chlorosilane | Metal | Catalyst | Promoter | Product |
|---|---|---|---|---|---|---|
| 13 | 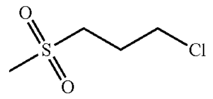 (1 mol) | 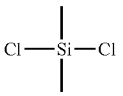 (1 mol) | Zn (1 mol) | KI | HMPA | 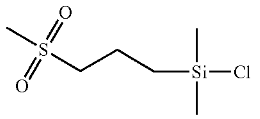 |

It is quite evident from the results displayed in table 1 and from the examples above (comparative examples 1 to 11) that conventionally known process that utilizes Mg as a metal does not lead to the desired product especially when functional groups such as —CN, —COR, —COOR, —CSR, —CSSR, —CSOR, —$CSO_2R$, —$CONR_2$, etc. are present in one of the reactants. Surprisingly, it was observed that a non-Mg metal (e.g., Zn) leads to the formation of the desired organosilicon compound It is also evident from the above table that certain combinations of reactants, use of a promoter and a metal halide catalyst play a significant role in the synthesis of desired compounds. In some examples of the present process, promoters containing P═O (e.g., HMPA, TOPO, TPPO) are expected to drive the reaction to generate the desired organosilicon compound (product). It is presumed that these promoters stabilize the Zn-complex and at the same time allows the removal of the Zn-halide byproduct as a complex [$ZnX_2$ $(HMPA)_2$], thereby driving the reaction to form the desired product. The advantage of this process is that the promoter could easily be regenerated (by simple acid treatment of complex [$ZnX_2$ $(HMPA)_2$]) and recycled. It is also evident from Example 25 that a promoter functions as a non-reactive solvent. In this example, HMPA functions as a promoter as well as a solvent leading to the successful formation of the desired product The present disclosure provides a process that is a viable alternative to conventional hydrosilylation process for synthesis of organosilicon compounds. Departing from the conventional wisdom of using a magnesium metal for the reaction of a halosilane with an alkyl halide, the present process, surprisingly, achieves a highly selective (>99%) conversion of alkyl halides and halosilanes into organosilicon compounds by using a non-magnesium metal in the presence of a reaction promoter. The present disclosure also provides novel organosilicon compounds.

Multiple obvious variations of the process are also contemplated within the scope of this invention. For example, in those instances where the reactant "alkyl halide" is selected as alkyl iodide, specific requirement for a metal iodide catalyst for the process could be obviated. In the present process, metal iodides (LiI, NaI, KI, $ZnI_2$ etc.) were utilized to convert alkyl chloride reactants to alkyl iodides insitu which further accelerates the formation of Zn-complex [$ZnX_2$ $(HMPA)_2$] and helps to drive the reaction to the desired product.

Further, the degree of insertion (substitution) of the organofunctional alkyl groups onto the halosilane depends upon the ratio of the alkyl halide to metallic Zn to halosilane. Thus, the present process provides a skilled person in the art a flexibility to incorporate mono-/di-/tri-/tetra-substituted organosilicon compound by modifying the ratio of the reactants as per requirement.

Further, a person skilled in the art can utilize one pot sequential addition of different functional alkyl halides to prepare multifunctional organosilicon compound.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a method for producing an organofunctional silicone from an organofunctional alkyl halide and a halosilane. Modifications may occur to those skilled in the art and to those who may make and use the invention. The disclosed embodiments are merely for illustrative purposes and not intended to limit the scope of the invention or the subject matter set forth in the claims.

What is claimed is:

1. A process for synthesis of an organosilicon compound of the formula (1), $$[(R^1)\text{—}(C(R^2)(R^3))_m]_p\text{—}Si(R^4)_{4-n}(X^1)_{n-p} \quad (1)$$

the process comprising reacting (i) a halosilane of the formula (2)

$$(X^1)_n\text{—}Si(R^4)_{4-n} \quad (2)$$

with (ii) p moles of an organofunctional alkyl halide of the formula (3)

$$[(R^1)\text{—}(C(R^2)(R^3))_m]\text{—}X^2 \quad (3)$$

in the presence of (iii) a non-magnesium metal, and (iv) a promoter selected from the group consisting of a phosphorous containing compound, a sulfur containing compound, or mixtures thereof:

where $R^1$ is an organofunctional group;
$R^2$ is H or a $C_1$-$C_{20}$ alkyl;
$R^3$ is H or a $C_1$-$C_{20}$ alkyl;
$R^4$ is a $C_1$-$C_{20}$ alkyl;
$X^1$ is F, Cl, Br, or I;
$X^2$ is F, Cl, Br, or I;
m is an integer in the range of 1-10;
n is an integer in the range of 1-4; and
p is an integer in the range of 1-4 with the proviso that p is ≤n.

2. The process of claim 1, wherein $R^1$ is independently selected from the group consisting of a C1-C20 alkyl, —$CR^5$═$CR^6_2$, —C≡$CR^7$, —CN, —$C(O)R^8$, —$OC(O)R^9$, —C(O)OR$^{10}$, —SR$^{11}$, —S(O)$_2$R$^{12}$, —NR$^{13}{}_2$, —C(O)NR$^{14}{}_2$, —OC(O)—CR$^{15}$═R$^{16}{}_2$, —CF$_3$, —(CR$^{17}{}_2$)$_n$—CF$_3$, —NCO, —CS—OR$^{18}$, —CSSR$^{19}$, —NR$^{20}$C(O)—CR$^{21}$═CR$^{22}{}_2$ a C6-C20 aryl, an aralkyl, or an alkaryl, where R$^5$, R$^6$, R$^7$, R$^8$, R$^9$, R$^{10}$, R$^1$, R$^{12}$, R$^{13}$, R$^{14}$, R$^{15}$, R$^{16}$, R$^{18}$, R$^{19}$, R$^{20}$, R$^{21}$, and R$^{22}$ are each independently H, a C1-C20 alkyl, a C3-C20 cycloalkyl, a C6-C30 aryl, an aralkyl, or an alkaryl, and R$^{17}$ is H, a C1-C10 alkyl, or F.

3. The process of claim 1, wherein the non-magnesium metal is selected from the group consisting of an alkali metal, an alkaline earth metal, a transition metal, a post transition metal, a metalloid, a lanthanide, an actinide, or mixtures thereof.

4. The process of claim 3, wherein the non-magnesium metal is selected from the group consisting of Li, Na, K, Rb, Cs, Be, Ca, Sr, Ba, Fe, Co, Ni, Cu, Zn, B, Sb, Te, La, Ce, Sm, or mixtures thereof.

5. The process of claim 4, wherein the non-magnesium metal is Zn.

6. The process of claim 1, wherein molar ratio of the non-magnesium metal to the organofunctional alkyl halide in a range of 0.5:1 to 1:5.

7. The process of claim 1, wherein the promoter is selected from the group consisting of a phosphine oxide, a phosphate, a phosphite, a phosphine, a phosphoramide, or mixtures thereof.

8. The process of claim 7, wherein the phosphine oxide is of the formula R$^{20}{}_3$P═O or formula (R$^{21}{}_2$N)$_3$P═O where each R$^{20}$ is independently a $C_4$-$C_{20}$ alkyl, a $C_3$-$C_{20}$ cyclic alkyl, an aralkyl, or an alkaryl, where each R$^{21}$ is independently selected from a $C_1$-$C_{10}$ alkyl and a $C_3$-$C_{20}$ cyclic alkyl.

9. The process of any of claim 8, wherein the promoter is tributyl phosphine oxide (TBPO), trioctylphosphine oxide (TOPO), hexamethylphosphoramide (HMPA), trimorpholinophosphine Oxide or Tripyrrolidinophosphine Oxide, or a combination thereof.

10. The process of claim 1 further comprising a catalyst.

11. The process of claim 10, wherein the catalyst is a metal salt selected from the group consisting of a metal halide, a metal acetate, a metal ester, a metal amide, a metal triflate, a metal borate, a metal nitrate, or mixtures thereof.

12. The process of claim 11, wherein the metal salt comprises a metal selected from the group consisting of an alkali metal, an alkaline earth metal except magnesium, a transition metal, a post transition metal, a metalloid, a lanthanide, an actinide, or mixtures thereof.

13. The process of claim 11, wherein the catalyst is a metal halide.

14. The process of claim 10, wherein the catalyst is a metal iodide.

15. The process of claim 10, wherein $X^2$ is Cl.

16. The process of claim 1, wherein the halosilane is reacted with the alkyl halide at a temperature in the range of, from about 10° C. to about 200° C.

* * * * *